United States Patent
Prevost et al.

(10) Patent No.: US 6,570,555 B1
(45) Date of Patent: May 27, 2003

(54) METHOD AND APPARATUS FOR EMBODIED CONVERSATIONAL CHARACTERS WITH MULTIMODAL INPUT/OUTPUT IN AN INTERFACE DEVICE

(75) Inventors: Scott A. Prevost, San Francisco, CA (US); Timothy W. Bickmore, Somerville, MA (US); Joseph W. Sullivan, San Francisco, CA (US); Elizabeth Churchill, San Francisco, CA (US); Andreas Girgensohn, Menlo Park, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/223,637

(22) Filed: Dec. 30, 1998

(51) Int. Cl.⁷ .................................................. G09G 5/00
(52) U.S. Cl. ..................................................... 345/156
(58) Field of Search ................................. 345/156, 157

(56) References Cited

U.S. PATENT DOCUMENTS

| | | | |
|---|---|---|---|
| 4,965,741 A | * 10/1990 | Winchell et al. | 706/11 |
| 5,111,409 A | * 5/1992 | Gasper et al. | 345/302 |
| 5,157,384 A | * 10/1992 | Greanias et al. | 345/156 |
| 5,310,349 A | * 5/1994 | Daniels et al. | 434/350 |
| 5,432,887 A | * 7/1995 | Khaw | 706/19 |
| 5,563,988 A | 10/1996 | Maes et al. | 345/421 |
| 5,936,624 A | * 8/1999 | Lisle et al. | 345/348 |
| 6,012,030 A | * 1/2000 | French-St. George et al. | 704/275 |
| 6,058,387 A | * 5/2000 | Campbell et al. | 706/60 |
| 6,072,473 A | * 6/2000 | Muller et al. | 345/173 |
| 6,075,515 A | * 6/2000 | Keyson | 345/156 |
| 6,084,569 A | * 7/2000 | Ricotta et al. | 345/156 |

OTHER PUBLICATIONS

Badler, N., et al. *Jack Presenter*, Video demonstration given at Virtual 2 Humans conference, Los Angeles, 1997. Information on the Jack project can be found at http://www.cis.upenn.edu/~hms/home.html.

Bickmore, T.W., "Behavior Synchronization for Conversational Humanoids," GNL Group, MIT Media Lab, Aug. 23, 1998.

Bickmore, T., Cook, L., Churchill, E. and Sullivan, J., "Animated Autonomous Personal Representatives," Autonomous Agents Conference, 1998, http://www.media.mit.edu/~bickmore/publications/AGENTS98.pdf.

(List continued on next page.)

Primary Examiner—Richard Hjerpe
Assistant Examiner—Kevin M. Nguyen
(74) Attorney, Agent, or Firm—Fliesler, Dubb, Meyer & Lovejoy LLP

(57) ABSTRACT

Deliberative and reactive processing are combined to process multi-modal inputs and direct movements and speech of a synthetic character that operates as an interface between a user and a piece of equipment. The synthetic character is constructed as an ally, working with and helping the user learn and operate the equipment. The synthetic character interacts with both a virtual space where the character is displayed, and a physical space (domain) that includes the user. Real-time reactive processing provides lifelike and engaging responses to user queries and conversations. Deliberative processing provides responses to inputs that require more processing time (deep linguistic processing, for example). Knowledge bases are maintained for both dynamic (discourse model, for example) and static (e.g., knowledge about the domain or discourse plans) information types. A rule based system is utilized against the knowledge bases and selected inputs from said user to determine input meanings, and follow a predetermined discourse plan.

32 Claims, 16 Drawing Sheets

ARCHITECTURE WITH DATA STORES SHOWN

OTHER PUBLICATIONS

Blumberg, B., Old Tricks, New Dogs: Ethology and Interactive Creatures, MIT Media Laboratory, Ph.D. Thesis, Sep. 1996.

Cassell, J., "Storytelling as the nexus of change in the relationship between gender and technology." In Casell & Jenkins (eds.) Gender and Computer Games: from Barbie to Mortal Kombat. MIT Press, 1998.

Cassell, J., Pelachaud, C., Badler, N., Steedman, M., Achorn, B., Becket, T., Douville, B., Prevost, S., and Stone, M., "Animated Conversation: Rule–based generation of facial expression, gesture and spoken intonation for multiple conversational agents," *Computer Graphics (SIGGraph Proceedings)*, 1994.

Cassell, J. & Thórisson, K., "The Power of a Nod and a Glance: Envelope vs. Emotional Feedback in Animated Conversational Agents." *Applied Artificial Intelligence*, 1999, vol. 13, pp. 519–538.

Microsoft Corporation. *Persona: Conversational Interfaces*, available at http://www.research.microsoft.com/ui.

Noma, T., Zhao, L. and Badler, N., "Design of a Virtual Human Presenter," IEEE Computer Graphics and Applications 20(4), Jul./Aug. 2000, pp. 79–85.

Perlin, K. and Goldberg, A., "Improv: A System for Scripting Interactive Actors in Virtual Worlds". *Proc. SIGGRAPH '96*. (available at http://www.mrl.nyu.edu/improv/).

Prevost, S. 1996, An Information Structural Approach to Monologue Generation. *Proceedings of the 34$^{th}$ Annual Meeting of the Association for Computational Linguistics*, pp. 294–301, 1996.

Reeves, B. and Nass, C., The Medial Equation: How People Treat Computers, Television and the New Media Like Real People and Places. Cambridge University Press, 1996.

Thórisson, K., *Communicative Humanoids: A Computational Model of Psychosocial Dialogue Skills*. Thesis, Massachusetts Institute of Technology Media Laboratory, Cambridge, MA, 1996.

Vilhjálmsson, H., *Autonomous Communicative Behaviors in Avatars*. Master's thesis. Massachusetts Institute of Technology, 1997.

* cited by examiner

SYNTHETIC CHARACTER HIERARCHY

ALLY INTERFACES

EXAMPLE INTERACTION WITH A CONVERSATIONAL CHARACTER

USER INTERACTIONS WITH THE PHYSICAL ENVIRONMENT

HIGH-LEVEL VIEW OF ARCHITECTURE AND DATA FLOW

ARCHITECTURE WITH DELIBERATIVE COMPONENT MODULES EXPANDED

ARCHITECTURE WITH DATA STORES SHOWN

TOP-LEVEL BEHAVIOR HIERARCHY

RESPONSE PLANNER MODULE

GENERATION MODULE

ACTION SCHEDULING MODULE

KUMO CHARACTER PLANNING SCENARIO

KUMO CHARACTER PLANNING SCENARIO

METHOD AND APPARATUS FOR EMBODIED CONVERSATIONAL CHARACTERS WITH MULTIMODAL INPUT/ OUTPUT IN AN INTERFACE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to human-computer interfaces (HCI). The invention is more particularly related to the interaction of a user and an animated anthropomorphic character as an HCI. The invention is even more particularly related to architecture for building the anthropomorphic character. And, the invention is still further related to an integration of processing techniques and input/output (i/o) modalities for producing a conversational character interface that is intuitive to a user having only language and interaction skills.

2. Discussion of the Background

Synthetic, animated characters can be divided into two broad categories: characters that are directly controlled by a human user's actions, and characters that perform behaviors, independent of the user's actions, either autonomously or through pre-compiled scripts. A taxonomy of synthetic character types is illustrated in FIG. 1.

Characters controlled by a user's actions are often called an "avatar" and generally serve as a representation in a virtual environment of the user who controls its behavior. These avatar characters are used in graphical chat-rooms and on-line virtual worlds such as Habitat, the Palace, BodyChat [Vilhjalmsson97], Oz Virtual, OnLive! Technologies and Worlds, Inc.

Due to the computational complexity of real-time interactions in graphical virtual environments, avatar representations tend to be graphically simplistic and insufficient for representing spontaneous gestures, facial expressions, and other non-verbal behaviors. Moreover, because the input modalities are severely restricted in online virtual worlds, generally confined to the mouse and keyboard, avatar users are forced to exercise fine-grained, conscious control over each gestural movement.

Vilhjalmsson's BodyChat system attempts to overcome this difficulty by integrating a model of awareness and turn-taking behaviors into its avatars. For example, giving the avatars some autonomy to make decisions about where to look based on user defined parameters for conversational engagement.

Another use of directly controlled characters is for automatically generating animations based on the movements of human actors. By correlating points on an actor's body with nodes in the graphical representation of the character, this "performance animation" technique imbues the character with the ability to produce fine-grained gestures and facial expressions, and exhibit realistic gaze behaviors and body movements.

Characters that are not directly controlled by the user can be subdivided into two groups: those whose behaviors are scripted in advance, and those whose behaviors are essentially autonomous, and derived at runtime based on inputs from the user. The range of behaviors of the former type of character must be explicitly defined by the character's creator. One advantage of pre-scripting is that the integration of verbal and non-verbal behaviors need not be calculated at runtime, thereby avoiding complicated on-the-fly planning of motor controls in the animation model.

Scripted characters, on the other hand, are limited in their ability to interact with users and react to multimodal user inputs. Examples of scripted character systems include:

Document Avatars [Bickmore97]. These characters are attached to hypertext documents, and can be scripted to perform specific behaviors when certain parts of the document (e.g. links) are selected. Document avatars can be used to provide guided tours of a document, representing a particular reader's viewpoint. They can be scripted to speak, move around the document, point to objects and activate links.

Microsoft Agent [Microsoft97]. These characters can be scripted to speak a text string, perform specific animation sequences, hide, move and resize. The user interacts with a character by dragging it or selecting commands from a pop-up menu.

Jack Presenter [Badler97]. This system allows an anthropomorphically correct 3D animated figure to be scripted to give a presentation. The character's author provides the narrative text which includes annotations describing where, when and what type of gestures should occur. Users simply observe the character's pre-determined behaviors.

PPP Persona [Andre96]. This project uses a planning system to plan tutorials of specified material given a target time duration for the presentation. Presentations are not scripted by human authors, but are instead created by a planning system. Unlike Document Avatars and Microsoft Agent characters, users cannot interact with the characters during a presentation.

The second group of indirectly controlled characters are the autonomous (or semi-autonomous) characters. Work in this area can be further divided into two categories: entertainment/simulation characters, and task-based characters. The former category includes non-human character representations (e.g. The MIT Media Laboratory's ALIVE system [Maes94], PF Magic's Dogz, Fujitsu Interactivel's Fin Fin, and CMU's Oz) as well as systems for authoring anthropomorphic virtual actors (the NYU Media Research Laboratory's Improv system [Perlin96], and Stanford's Virtual Theater Project).

Prior task-based autonomous characters include the following systems:

Microsoft Office Characters The MS Office suite of applications includes a collection of animated characters to provide user assistance and an interface to the online documentation. These characters can respond to typed, free-form questions, and respond with text balloons containing mouse-clickable menu options.

Microsoft Persona [Microsoft97] The Persona project allows a user to control a computerized jukebox through an animated character who accepts speech input and produces spoken output with limited spontaneous gestures.

Animated Conversation [Cassell94] In this system, two animated characters, Gilbert and George, can converse with one another, using context-appropriate speech, gestures and facial expressions, to negotiate banking transactions in a virtual bank.

Ymni [Thorisson96] Ymir is an architecture for autonomous characters that display turn-taking and other interactional competencies. The user interacts with Gandalf, an animated character developed in the Ymir architecture, using natural speech and gestures to ask questions about the solar system. Of the prior art cited above, only the Gandalf/Ymir system utilizes some natural non-verbal inputs such as gesture and head position.

User interfaces, including the above described synthetic characters, often exploit common metaphors, such as the desktop, in an attempt to make computer systems easier and more intuitive to use. These metaphors, however, are not always well understood by users, particularly novices, who often require extensive training. As computing becomes ubiquitous in the modern world and as the complexity of systems increases, the need for methods of human-computer interaction that require only minimal specialized expertise and training has also increased.

Recent research [Reeves&Nass97] has suggested that human interactions with computers, and indeed other forms of media, are intrinsically social in nature, that we (unconsciously) treat computers as social actors, and that the rules that govern our social interactions with other people are imputed by users to their computers. However, many of the common interaction metaphors (e.g. menus, desktops, windows, etc.) focus on the computer as a physical tool, something the user must master to use effectively.

SUMMARY OF THE INVENTION

The present inventors have realized that interface metaphors that are based on social rules of engagement, rather than physical tools, will provide great benefit to many users, allowing them to socially interact with computers and other devices, rather than require training on specific tools or programs.

Accordingly, it is an object of this invention to provide an interface based on social rules of engagement.

It is another object of this invention to provide an interface based on construction of a user ally for operation of a computer or other device.

It is another object of the present invention to integrate multiple processing techniques and multiple i/o modalities to provide a conversational character operating as a naturalistic, intuitive, and coherent interface.

It is another object of the present invention to provide a modular architecture for a conversational character that provides both raw and processed data for a central module that determines what action the conversational character takes.

It is yet another object of the present invention to provide a walk-up interface operable by a user with only basic language and interaction skills.

It is yet another object of the present invention to provide a conversational character that interacts within a virtual space of the character and a physical space of the user.

These and other objects are accomplished by an interface for a system, including, an input device configured to capture user inputs, a processing component that integrates deliberative and reactive processing performed on said user inputs, and an output mechanism for performing actions based on the deliberative and reactive processing.

Alternatively, the invention includes a multi-modal interface that captures user inputs, and a synthetic character configured to respond to said inputs. The multi-modal inputs may preferably feed a combination of deliberative and reactive processing that controls the synthetic character.

The present invention also includes a method for operating a device, including the steps of displaying a virtual space; retrieving user inputs from a user in a physical space; and combining both deliberative and reactive processing on said inputs to formulate a response.

The deliberative processing includes the steps of fusing selected portions of the user inputs into a coherent understanding of the physical environment and actions of the user; updating a discourse model reflecting current and past inputs retrieved from the user; and outputting, to the reactive processing, at least one frame describing the user inputs.

The reactive processing includes the steps of receiving asynchronous updates of selected of the user inputs and understanding frames concerning the user inputs from said deliberative processing; accessing data from a static knowledge base about a domain and a dynamic knowledge base having inferred information about a current discourse between the user, physical environment, and virtual space; and determining a current action for the virtual space based on the asynchronous updates and data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Each of the scripted character systems described above suffers from deficiencies that are addressed by our proposed character architecture. These are described below:

Multimodal asymmetry Characters can "communicate" with the user through speech, facial expressions and gestures, but are unable to perceive the same behaviors on the part of the user. User input is restricted to mouse clicks and simple textual commands. While these systems provide output in a form that is easy for users to.comprehend, the impoverished input modalities do not make these characters suitable for conversational interfaces.

Lack of context Because behaviors are scripted in advance, these characters are quite limited in their ability to respond differently depending on context. For example, when a document avatar is dropped on a specific hyperlink, it always displays the same behavior, regardless of other actions that have taken place.

Figure 1:
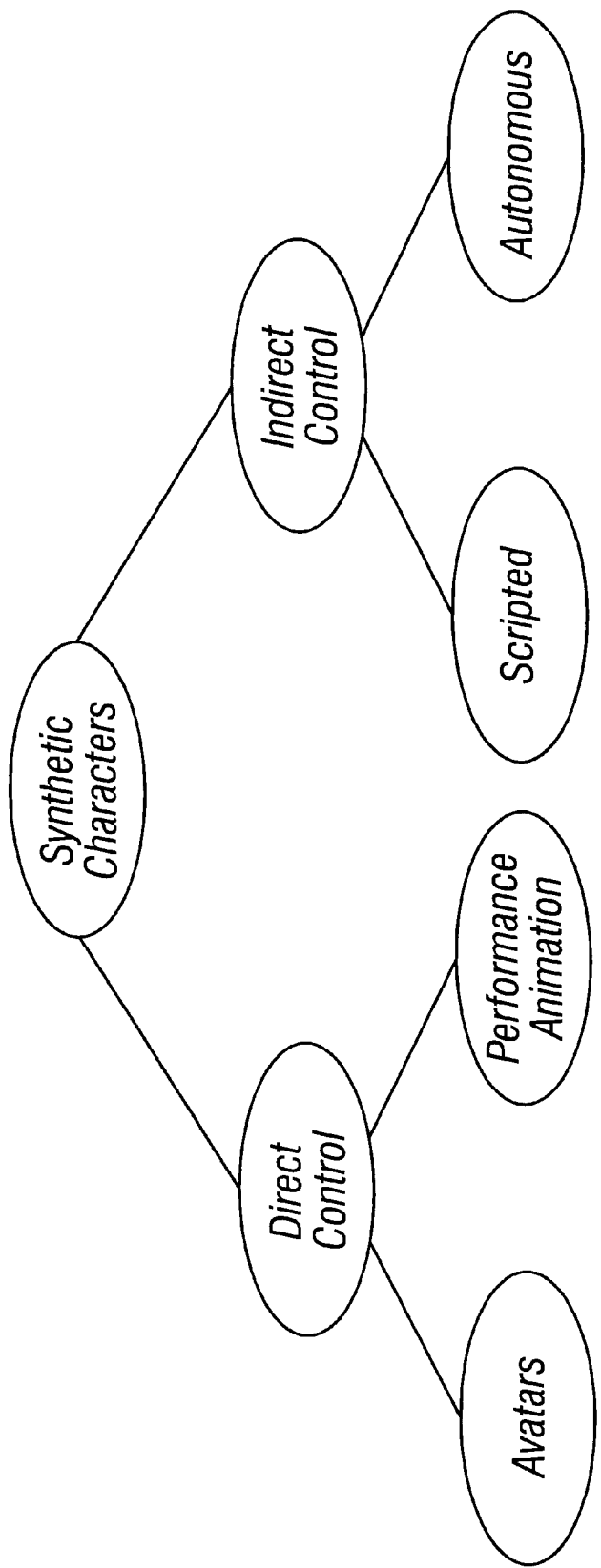
FIG. 1 is a hierarchical chart of synthetic character types.
Figure 2:
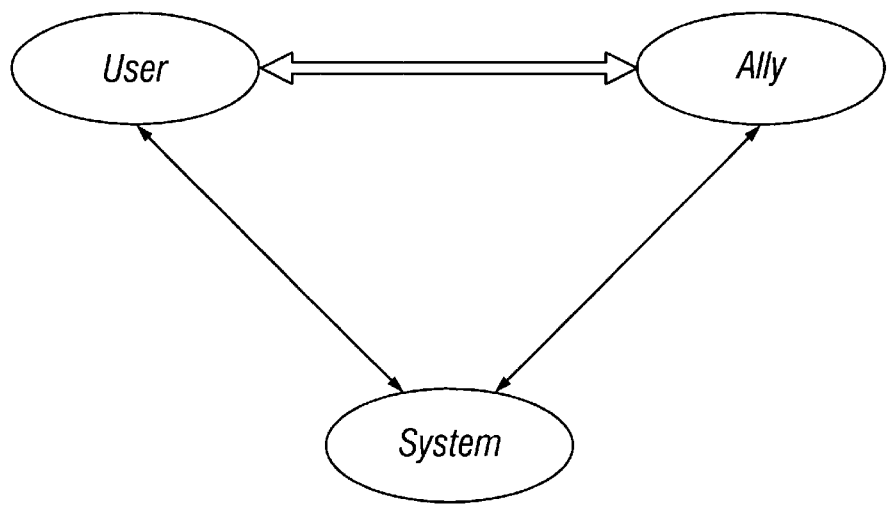
FIG. 2 is an interaction diagram illustrating interactions between a user, a system, and an ally.

Referring again to the drawings, wherein like reference numerals designate identical or corresponding parts throughout the several views, and more particularly to FIG. 2 thereof, there is illustrated an interaction diagram of an interface. The diagram illustrates one example of the interactions between a user, a system, and an ally. Dark lines represent the parts of the system to which the user has direct access. A density of the arrow between the user and the ally indicates the bandwidth of their interactions with respect to the number of modalities they can communicate with.

The interface is based on a social construct of allegiance. An architecture is provided for building animated, virtual interface characters that serve as the user's ally in using a complex computational system, providing assistance in gathering information, executing commands or completing tasks.

Traditional user interfaces based on tool metaphors often promote an adversarial relationship between the user and the interface, often creating the impression that the interface is working against, rather that for, the user. Research by Reeves and Nass suggests that such attributions of social (or antisocial) behavior are common. The present inventors have realized that designing animated character interfaces that explicitly display allegiance with the user through language, personality, and ease of use, minimize undesirable adversarial interactions.

The present inventors have also realized that one way to foster feelings of allegiance between the user and a character interface is through the social metaphor of face-to-face conversation involving multiple modalities, including speech, facial expressions, gestures, and other forms of bodily communication. Face-to-face interaction with an animated character allows the user to disassociate the interface from the complexity of the underlying system. Interfaces built around the metaphor of face-to-face interaction allow human users to rely on their well established and thoroughly rehearsed social skills, rather than forcing them to learn new "tools."

Much research has already been performed in the field of natural language processing (NLP). Unfortunately, NLP systems have mostly relied on textual input, requiring users to learn a tool-based interface just to get to the point of typing questions and commands in a natural language like English. Speech interfaces avoid some of the pitfalls of text-only NLP systems, but fail to utilize information in the non-verbal channels, such as gestures, as well as some of the information in the speech wave itself, such as the meaning carried by the speaker's intonation.

There are at least two important roles played by gestures, facial expressions, and intonational patterns in face-to-face interactions. First, these "paraverbal" behaviors can convey semantic content that cannot be recovered from the speech alone, such as when a speaker identifies an object by making a pointing gesture. Second, they can signal subtle interactional cues that regulate the flow of information between interlocutors, such as when a speaker's intonation rises at the end of a phrase in attempting to hold the speaking floor.

Figure 3:
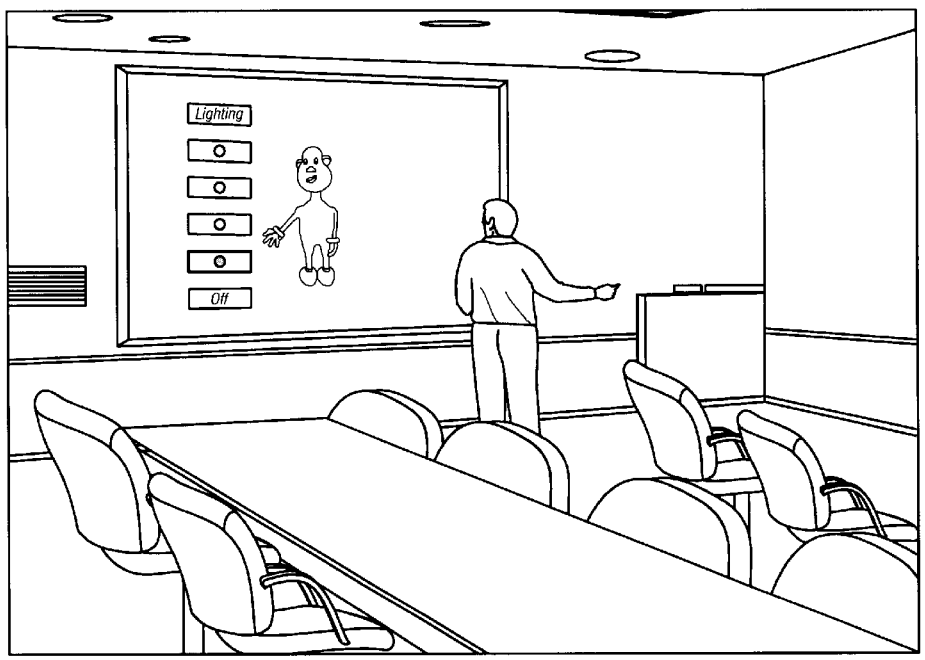
FIG. 3 is an illustration of an example interaction with a conversational character.

The architecture of the present invention does not separately address these roles (as in previous synthetic character architectures), but instead provides a unified model that processes both content-bearing and interactional behaviors in both input and output modalities. The present invention provides an architecture for building animated, ally character interfaces with task-based, face-to-face conversational abilities (i.e., the ability to perceive and produce paraverbal behaviors to exchange both semantic and interactional Characters developed under the architecture of the present invention have the ability to perceive the user's speech, body position, certain classes of gestures, and general direction of gaze. In response, such characters can speak, make gestures and facial expressions, and direct their gaze appropriately. These characters provide an embodied interface, apparently separate from the underlying system, that the user can simply approach and interact with naturally to gather information or perform some task. An example interaction is shown in FIG. 3, in which the character is explaining how to control the room lighting from a panel display on the podium. Instead of having to read a help menu or other pre-scripted response, the user is interacting with the character which works with the user to solve the problem at hand.

The present invention integrates theories and technologies, including architecture that deals with content-bearing information (generating the content of a conversation in several modalities) and architecture that deals with the nature of interactions between the two participants in a conversation, likewise relying on several modalities. The present invention is unique in integrating language understanding and generation with multimodal inputs and outputs representing non-verbal communicative behaviors in real time. This invention has applications for controlling a wide variety of systems and devices, including copiers, conference facilities, audio-video (AV) equipment, and personal computer (PC) application software.

The present invention also integrates and unifies reactive and deliberative architectures for modeling autonomous anthropomorphized characters who engage in face-to-face interactions. A reactive architecture gives a character the ability to react immediately to verbal and non-verbal cues without performing any deep linguistic analysis. Such cues allow the character to convincingly signal turn-taking and other regulatory behaviors non-verbally. A deliberative architecture, on the other hand, gives the characters the ability to plan complex dialogue, without the need to respond reactively to non-verbal inputs in real time.

The present invention also merges reactive and deliberative functionalities, allowing a character to simultaneously plan dialogue while exhibiting appropriate reactive non-verbal behaviors. Because the reactive and deliberative behaviors must work in concert, an adequate architecture is not achieved by simply concatenating reactive and deliberative architectures, but rather an integration of the reactive and deliberative aspects of those architectures.

The present invention also provides a dynamic interaction between the character and the physical space occupied by the user. The character may point to objects in the physical space, or the user may point to objects in a virtual space occupied by the character. In addition, the various inputs allow the interface to track (via video or sensor based equipment), or recognize where equipment is located.

The integration of reactive and deliberative behaviors is accomplished in the proposed architecture by a modular design centered around a component, the "reactive module," that runs in a tight loop (see FIG. 11, for example) constantly evaluating the state of the "world" at each iteration. Information about the world comes from raw input data representing non-verbal behaviors, such as coordinates that specify where the human user is looking, as well as processed data from deliberative modules, such as representations of the meanings of the user's utterances or gestures.

At each step, the reactive module makes decisions, based on weights and priorities (the salience of each of a set of rules whose preconditions have been satisfied), about which inputs require action and how the actions are to be organized. Unlike Animated Conversation, deliberative behaviors are subject to regulation by the reactive module, so that, for example, the character knows it may need to ignore the user's speech if the user turns her back on the character. The reactive behaviors are the product not only of the immediately preceding actions, but also of dialogue plans (produced in by the deliberative language components) which may require several loop iterations to be executed. For example, the character's gaze behavior, which is a prominent indicator of turn-taking in dialogue, might be affected by its knowledge that several plan steps must be executed to achieve a particular discourse goal.

As a consequence of using a hybrid architecture which integrates reactive and deliberative planning, several additional novel features for autonomous, synthetic characters can be realized. These are summarized in the paragraphs below.

Spoken Language Processing

Table 1 illustrates the comparative language capabilities of the autonomous character systems under consideration.

TABLE 1

COMPARISON OF LANGUAGE CAPABILITIES

| Capacity | Animated Conversation | Ymir (Gandalf) | Proposed Architecture |
|---|---|---|---|
| Natural Language Understanding | | x | x |
| Natural Language Generation | x | | x |
| Discourse Planning | x | | x |

The Ymir architecture does not integrate dialogue planning into its mostly reactive processing, and consequently, spoken output is canned (i.e. pre-planned). Because language (what to say and how to say it) is so dependent on context (roughly, the discourse history), canned responses often sound unnatural or contextually inappropriate. This has serious consequences for the believability of the character.

The present invention addresses this problem by adopting a simple template-based generation scheme that allows flexibility in referring expressions (the way one refers to objects in the world). The present invention also draws on Prevost's [Prevost96] model of topic/comment structure and its relation to intonational patterns to produce context-appropriate intonation in the synthesized speech output.

Integration of Propositional and Interactional Non-verbal Behaviors

As noted in the introduction section, the importance of non-verbal behaviors is twofold: to convey propositional content, and to regulate the flow of information in the interaction. While previous systems have concentrated on one or the other of these roles, our architecture analyzes non-verbal behaviors perceived by the multimodal inputs to interpret any apparent propositional content (such as pointing gestures or gaze direction) as well as to find interactional turn-taking cues (as signaled by gaze and body position). The modeling of interactional and propositional behaviors for autonomous characters is novel, and is a direct consequence of the present invention's hybrid architecture.

In addition to the novelty directly related to architectural decisions, several novel features of the present invention have yet to be realized in related systems. These features, which are described below, concern the character's representation and awareness of the physical environment, and consequently, the encumbrance placed on the user. Our system is designed to allow the user and the character to refer to objects in the real world, and to allow the character to perceive information about the user, such as her location, posture, etc.

For example:

Acknowledgment of user's presence—by posture, turning to face the user;

Feedback function—The character gives feedback in several modalities; she may nod her head or emit a paraverbal (e.g., "mmhmm") or a short statement such as "I see" in response to short pauses in the user's speech; she raises her eyebrows to indicate partial understanding of a phrase or sentence.

Turntaking function—The character tracks who has the speaking turn, and only speaks when she holds the turn. In one embodiment, the character always allows verbal interruption, and yields the turn as soon as the user begins to speak. If the user gestures she will interpret this as expression of a desire to speak [14], and therefore halt her remarks at the nearest sentence boundary. Finally, at the end of her speaking turn she turns to face the user to indicate the end of her turn. She also tracks the user's gaze direction to pick up an end of turn gaze cue.

Other functions have both interactional and propositional content. For example, in the same or other embodiments:

Greeting and Farewell functions—The character speaks and gestures when greeting and saying goodbye. During the greeting sequence, The character gives her name, and asks the user's name to add to the propositional database.

Emphasis function—people may emphasize particular linguistic items by prosodic means (pitch accents) or by accompanying the word with a beat gesture (short formless wave of the hand). Recognizing emphasis is important for determining which part of the utterance is key to the discourse. For example, the user may say "I'd like granite floor tiles," to which The character can reply "granite is a good choice here;" or the user might say "I'd like granite floor tiles," where The character can reply "tile would go well here." We are developing a gesture classification system to detect the 'beat' gestures that often indicate emphasis. On the output side, we plan to allow The character to generate emphasis using either modality.

These conversational functions are realized as conversational behaviors. For turn taking, for example, the following may be utilized:

If the character has the turn and is speaking and the user begins to gesture, this is interpreted as the user wanting turn function. If The character has the turn and is speaking and the user begins to speak, this is interpreted as the user taking turn function. If the user is speaking and she/he pauses for less than 500 msec., this is interpreted as the wanting feedback function. If the user is speaking and issues a declarative sentence and stops speaking and gesturing, or says an imperative or interrogative phrase, their input is interpreted as a giving turn function. Finally, if the user has the turn and continues gesturing after having finished uttering a declarative sentence, or if she/he begins another phrase after having uttered a declarative sentence, with a pause of less than 500 msec, this is interpreted as a holding turn function. This approach is summarized in Table 2.

TABLE 2

Functional Interpretation of Turn Taking Input

| State | User Input | Input Function |
| --- | --- | --- |
| Character speaking | Gesture | Wanting turn |
|  | Speech | Taking turn |
| User speaking | Pause of <500 msec | Wanting feedback |
|  | Imperative phrase | Giving turn |
|  | Interrogative phrase | Giving turn |
|  | Declarative phrase & pause >500 msec. & no gesture | Giving turn |
|  | Declarative phrase & long gesture or pause | Holding turn |

Thus, speech may convey different interactional information; it may be interpreted as taking turn, giving turn, or holding turn depending on the conversational state and what is conveyed by the other modalities.

A similar approach is taken for generation of conversational behaviors. The character generates speech, gesture and facial expressions based on the current conversational state and the conversational function she is trying to convey. For example, when the user first approaches The character ("User Present" state), she signals her openness to engage in conversation by looking at the user, smiling, and/or tossing her head. When conversational turn-taking begins, she orients her body to face the user at a 45 degree angle. When the user is speaking and The character wants the turn she looks at the user and utters a paraverbal ("umm"). When The character is finished speaking and ready to give the turn back to the user she looks at the user, drops her hands out of gesture space and raises her eyebrows in expectation. Table 3 summarizes The character's current output behaviors.

TABLE 3

Output Functions

| State | Output Function | Behaviors |
| --- | --- | --- |
| User Present | Open interaction | Look at user. Smile. Headtoss. |
|  | Attend | Face user. |
|  | End of interaction | Turn away. |
|  | Greet | Wave, "hello" |
| Character Speaking | Give turn | Relax hands. Look at user. Raise eyebrows |
|  | Signoff | Wave "bye" |
| User Speaking | Give feedback | Nod head Paraverbal |
|  | Want turn | Look at user. Raise hands. Paraverbal ("umm"). |
|  | Take turn. | Look at user. Raise hands to begin gesturing. Speak. |

Reference to Physical Objects

Figure 4:
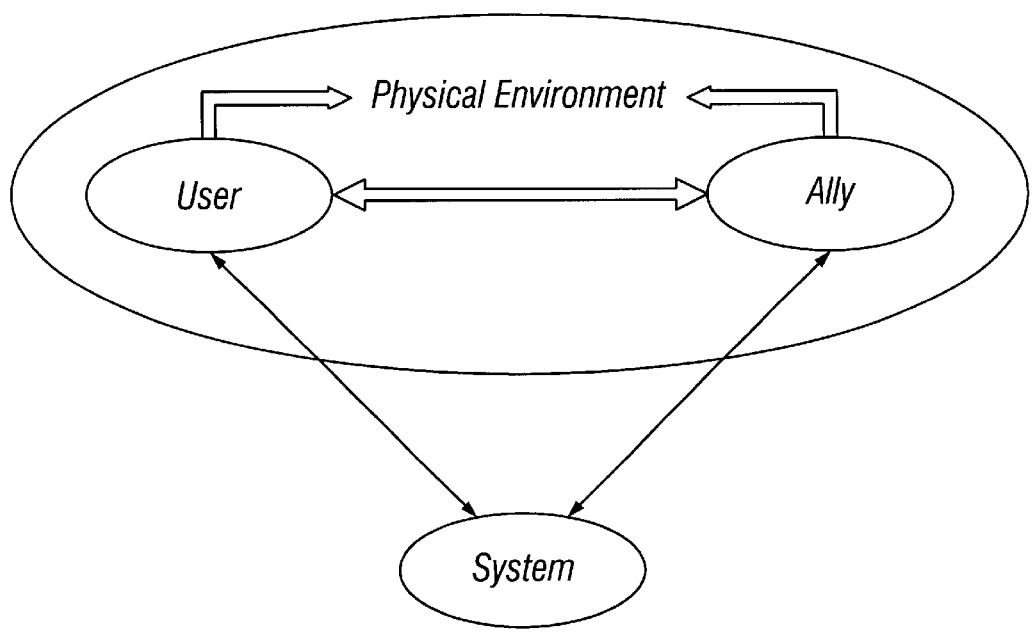
FIG. 4 is an interactional diagram illustrating interactions between a user and an ally with a physical environment.

As FIG. 4 illustrates, the architecture of the present invention allows the user to interact not only with a virtual animated character, but also with objects in the real world. The other systems described above allow users to interact only with virtual objects. For example, in the present invention's architecture the user can point to a lighting fixture in a conference room and ask the character to "turn on this light." Alternatively, the character may point to a lighting panel, or other object in the room and perhaps make comments on its use.

Multimodal Inputs

Table 4 categorizes the multimodal inputs and outputs utilized in the systems most relevant to the architecture of the present invention. As shown in Table 4, Ymir and the present invention's architecture account for a much wider range of multimodal inputs than the other systems, which rely mostly on text.

TABLE 4

MULTIMODAL INPUTS AND OUTPUTS FOR SYNTHETIC CHARACTER ARCHITECTURES

| I/O | Microsoft Office | Microsoft Personal | Animated Conversation | Ymir (Gandalf) | Proposed Architecture |
| --- | --- | --- | --- | --- | --- |
| Speech Input |  | x |  | x | x |
| Speech Output |  | x | x | x | x |
| Gesture Input |  |  |  | x | x |
| Gesture Output | x | x | x | x | x |
| Gaze Input |  |  |  | x | x |
| Gaze Output |  |  | x | x | x |
| Physical Environment |  |  |  |  | x |

Table 5 identifies important differences between the multimodal capabilities of Ymir and the present invention's architecture. Ymir requires users to wear cumbersome hardware, including a body tracking jacket, cybergloves, and a head-mounted eye tracker. These devices detract from the naturalness of the user's interaction, and also must be recalibrated for each user, a process that can take several minutes.

Moreover, the above-described devices produce output at a much finer granularity than Ymir can process, resulting in significant, unnecessary computation. For example, although the cybergloves provide data which describes the current geometry of individual finger joints, Ymir cares only about the position of the hands in space. Similarly, although Ymir's head-mounted eye tracker makes fine measurements of the user's direction of gaze, the system is concerned only with gross approximations of where the user is looking.

The present invention assumes a vision-based approach to gesture and gaze tracking, currently being developed at FXPAL and MIT. Although vision-based approaches cannot produce such fine-grained analyses, they provide at least as fine an analysis as that required by Ymir, while at the same time avoiding the encumbrance of body-mounted hardware. For example, the vision based systems determine x,y positioning of the user via color differencing, motion detection, or other technique.

Figure 5:
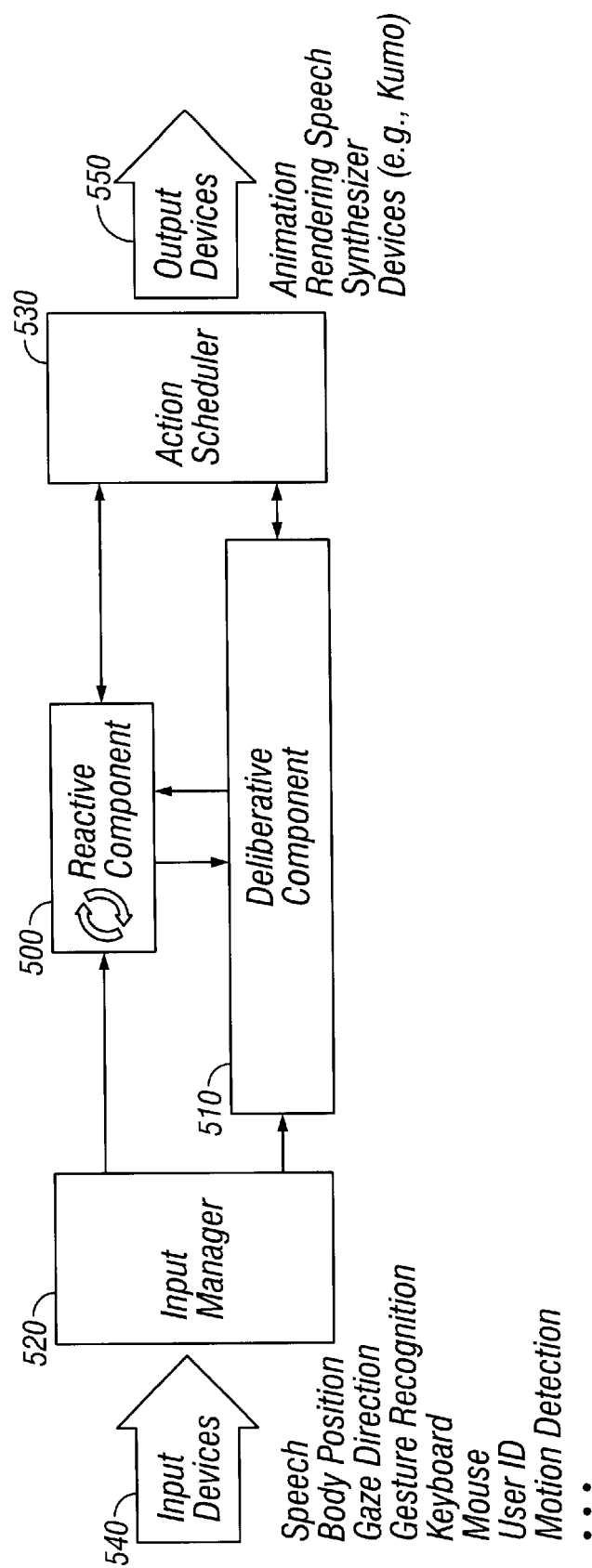
FIG. 5 is a block diagram illustrating an architecture supporting integrated deliberative and reactive processing components.

FIG. 5 shows a high-level diagram of the architecture of the present invention, showing a breakdown of modules including a reactive component which performs real-time processing (~15–30 Hz) and is fundamentally "reactive" in nature (see reactive component 500, also referred to as the reaction/reactive module), and a module that is more "deliberative" in that it performs non-trivial inferencing and can take multiple real-time cycles to produce a single output (see deliberative component 510, also referred to as the deliberation/deliberative module). An Input Manager 520 interfaces with all input devices 540, performs signal processing on input data, and routes the results to the reactive component 500 and the deliberative component 510 when available (asynchronously). An action scheduler 530 interfaces with all output devices 550, accepts action (output) requests (from reactive and deliberative components) and attempts to fulfill them, performing conflict resolution when necessary and notifying requesters when a requested action has been completed or canceled.

The reactive component 500 performs the "action selection" function in the system, determining what the character does at each time step. The deliberative component 510 performs functions such as uni-modal (speech only, for example) and multi-modal understanding of input data (perception), action/response, and action generation.

Figure 6:
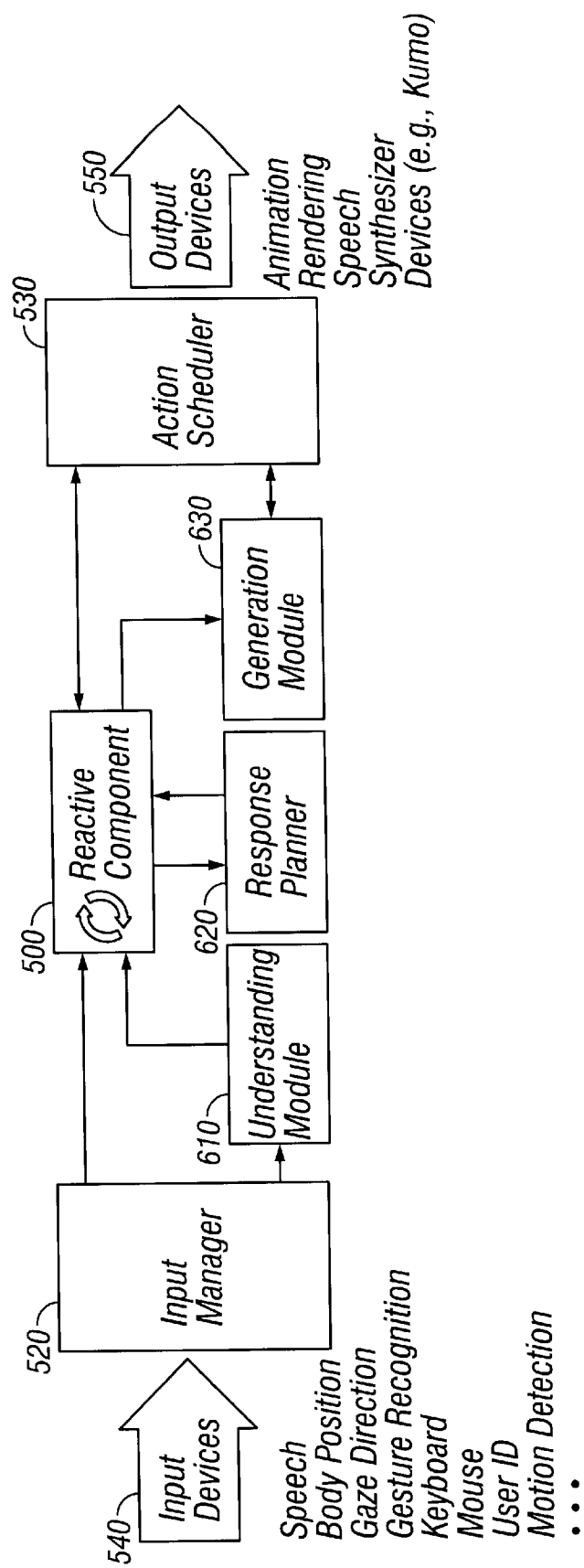
FIG. 6 is a block diagram of the architecture of FIG. 5 with the deliberative component expanded into modules.

FIG. 6 illustrates the deliberative functions expanded into the understanding, response planning, and generation modules 610, 620, and 630, respectively. The understanding module 610 performs multimodal sensor unification to understand what the user is doing or communicating. The response planning module 620 synthesizes action sequences that must be executed over time. The generation module 630 elaborates high-level action specifications into primitives that are directly executed in the current execution cycle.

Figure 7:
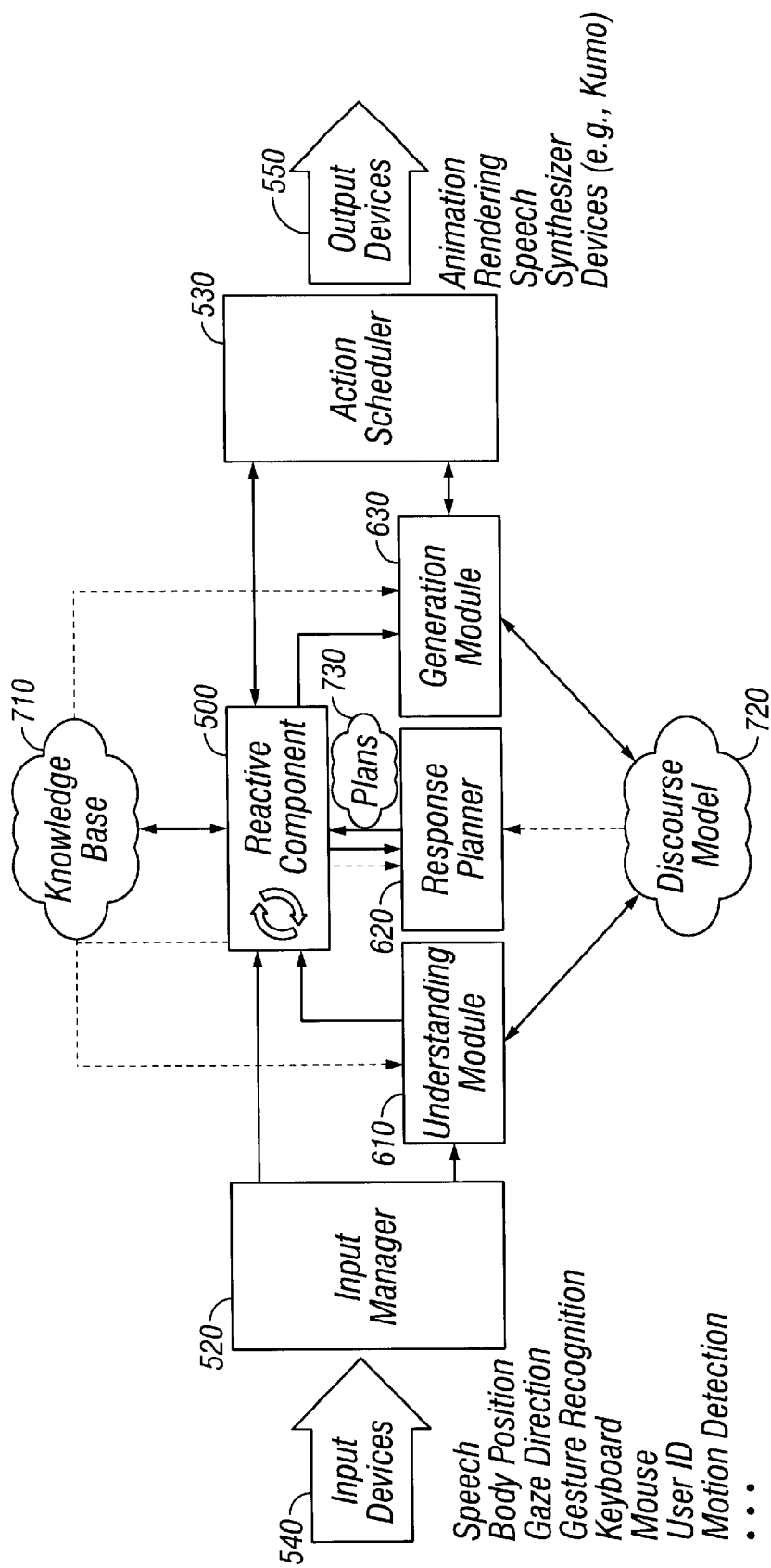
FIG. 7 is a block diagram of the architecture of FIG. 6 with additional flows that utilize a knowledge base, discourse model, and plans.

FIG. 7 illustrates a more detailed view of the architecture showing data stores used in the system. These represent state information shared among multiple modules, and include a knowledge base 710, a discourse model 720, and plans 730. The knowledge base 710 represents the working memory of the system and contains initialization data ("static knowledge base"), information about the state of the world such as a lighting level of a particular bank of lights, for example, and transient, short-term information about the user and the task at hand ("dynamic knowledge base") location of the user and gaze direction, for example. Various peripheral hardware is provided to allow inputs for determination of equipment locations (video cameras and recognition software, and sensor based systems, for example).

The discourse model 720 contains state information about the dialogue with the user (a history of semantic representations of utterances) and is used primarily in natural language understanding and generation. Plans 730 represent future actions that the character intends to take, and serve to influence the behavior of the reaction module. For example, steps 2 and 3 of a three step plan influence how step 1 would be implemented.

Having introduced the components of the architecture, we now describe the individual modules.

The Input Manager

The input manager 520 is primarily responsible for obtaining data from input devices, converting it into a form acceptable by the rest of the system (via algorithmic signal processing routines), and routing the results to the understanding module 610 and/or reactive component 500. Although this function could be performed synchronously with the reaction module 500 in very dynamic domains (e.g., real-time control applications), it will more likely function on an asynchronous basis, sending outputs only when an input changes, given relatively infrequent changes. However, some types of information may be obtained more efficiently, e.g., the current light settings, on a polled/as-needed basis, rather than sending asynchronous updates through the system and updating the dynamic memory every time it changes state.

In one embodiment, the input manager synchronizes (applies time stamps) data input from each of a virtual space occupied by the character and a real space (domain) including the user. The input manager also calibrates movements detected in the physical space to corresponding coordinates in the virtual space. Data input from the user and information input about the domain and virtual spaces is placed in a uniform structure to be passed on to other modules. A data structure referred to as a frame may be utilized as the uniform structure.

In a frame, data relating to specific aspects of interactions between the user and character (body position, or gaze direction, for example) are maintained in a same location for fast access/reference. Slots of the frame are utilized to store the data or reference other frames or data structures holding the data.

The input manager may update the dynamic knowledge base with information about the state of the world as soon as a change is detected. In another alternative, state information could easily be passed on to the reaction module which, in addition to acting on the information, could be entirely responsible for updating the dynamic knowledge base. Still further, the understanding module may be configured to 'inform' the input manager's perceptual tasks.

The input manager exists as a separate module so that device management can be offloaded from the understanding module 610 and reactive component 500, and so that a clean interface to the understanding and reaction modules is established. Device management can involve computationally complex and time-constrained operations such as device initialization, fault detection, and polling. The input manager itself may be implemented as a set of distributed processes in order to facilitate use of input devices on multiple computers. The input manager module should also provide appropriate input device abstractions so as to facilitate rapid addition of new devices to the system.

Figure 8:
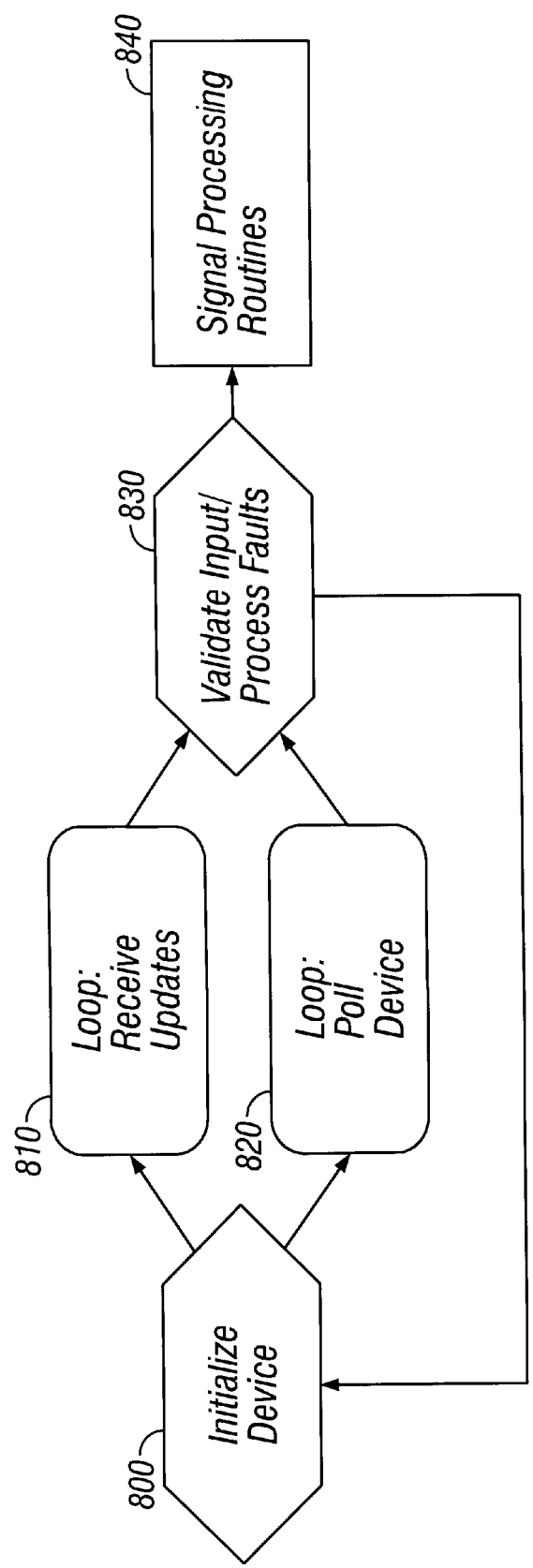
FIG. 8 is a flow diagram of operations of an input manager as illustrated in FIG. 5.

One embodiment of the input manager is illustrated in the flow diagram of FIG. 8. For each input device, the input manager starts by initializing the device 800 (i.e., sets up socket connections, starts the device processing). During the initialization phase, it determines whether the device will automatically send periodic updates 810, or whether updates need to be polled 820 at regular intervals or upon demand. In the former case, it sets up a loop (or event triggers) to capture updates. In the latter case, it sets up a loop (or event triggers) to determine when to request more data from the input device. Data received from the input device are validated 830 (checked for reasonable values) and then sent on to signal processing routines 840. The signal processing routines 840 extract relevant information from the data and package it for processing by other modules (subscribers to the input manager). In a case where multiple packets of data cannot be validated, the device is re-initialized and the process re-started.

The Reaction Module

The reaction module 500 is responsible for the "action selection" component of the architecture, which determines at each moment in time what the character should be doing. Thus, this module can also be thought of as the "executive" of the system, which functions as the locus of control for the entire architecture. The reaction module 500 receives asynchronous updates from the input manager 520 and understanding module 610, and uses information about the domain (static knowledge base) and information inferred from the current discourse (dynamic knowledge base) to determine the current action to perform.

Actions can be of three different forms: immediate primitive, immediate complex and future. Immediate primitive actions, which are those that need to be executed immediately and consist only of low-level actions (e.g., animation commands) are sent directly to the action scheduler 530. Immediate complex actions, which are those that need to be executed immediately but require elaboration, such as communicative actions, are sent to the generation module 630 for realization. Future actions, which are those that involve the planning of a sequence of actions, some or all of which are to be executed during a later update cycle, are sent to the response planner 620 for elaboration. The response planner 620 can return a plan (sequence of actions) to the reaction module, which the reaction module then caches for future reference.

One example of reactive processing in the present invention is an immediate reaction of the character upon a recognition of speech by a user. The reactive module does not wait for the speech to be either understood or even completed, but immediately sends commands for a reaction (gestures, speech or facial expressions, including raising of eyebrows, lifting a finger in contemplation of the users speech, or initiating a conversational gaze, for example).

Both the action scheduler and the generation module provide feedback regarding the completion of requested actions. In one embodiment, the reaction module is solely responsible for updating the dynamic knowledge base.

The action selection approach taken in the Reaction Module includes caching of plans generated by the response planner with future actions. As the time arrives for each step in a plan to be executed, the plan will "bias" the behavior selection system so that it will prefer behaviors which execute the plan step, however, the present invention maintains the opportunity to ignore the plan in response to a changed environment.

Figure 9:
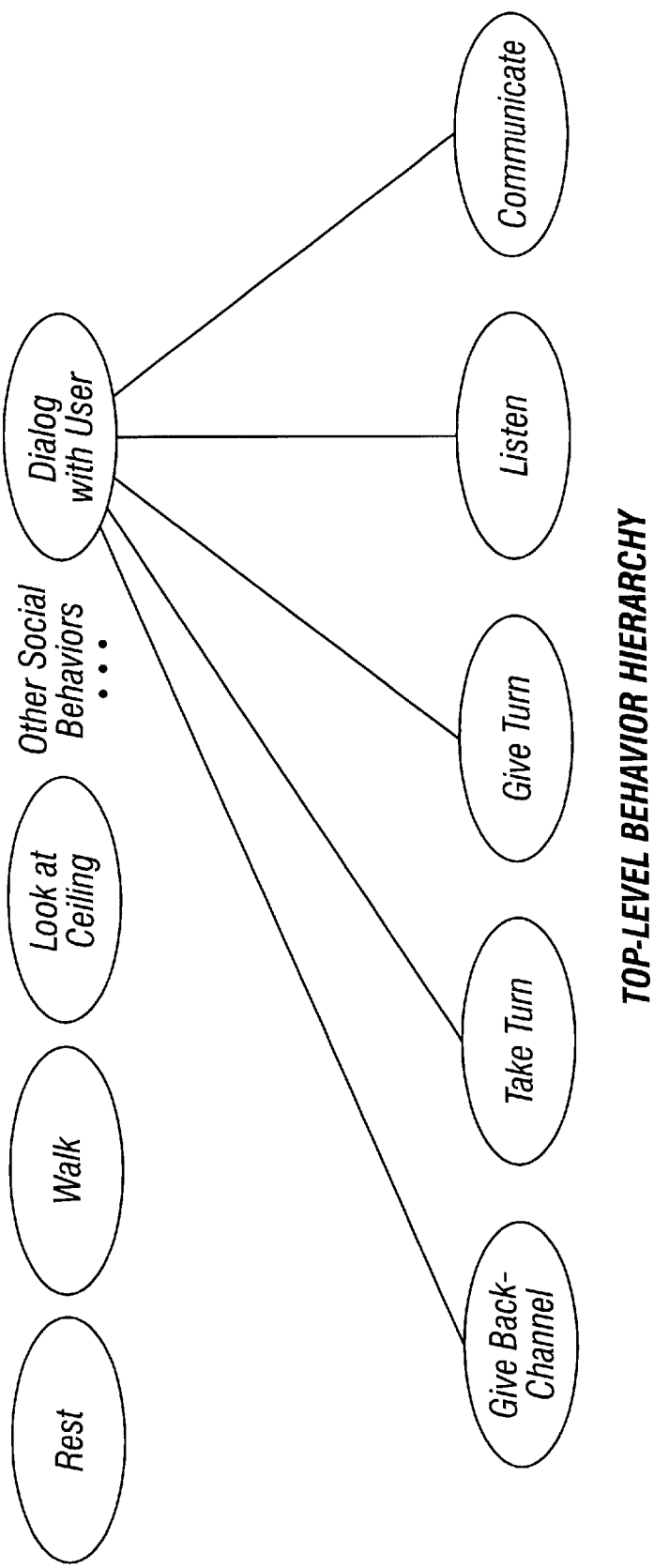
FIG. 9 is a behavior hierarchy of communicative acts and non-verbal social interaction rules.

The reaction module will model communicative acts and non-verbal social interaction rules in its behavior hierarchy as shown in FIG. 9. This enables the character to engage in an arbitrarily broad set of tasks in addition to communicating with the user, and enables true mixed-initiative dialog (where either the system or user can take control—ask questions, for example) to be carried out (vs. the one-sided, user-initiated dialog performed in the Gandalf system).

A constraint on this module's implementation is runtime efficiency. While the update frequency need not be as great as the animation update rate (approx.>=15 Hz), it is preferably at least 2–5 Hz to ensure smooth animation (e.g., transitions between actions) and responsiveness. Since most real-time autonomous system architectures tend to be reaction-based, a flexible forward-chaining rule-based language as a basis upon which various control schemes are built is an option. Candidates include CLIPS (public domain C-based NASA product) and JESS (implementation of a subset of CLIPS in Java from Lawrence Livermore).

Figure 11:
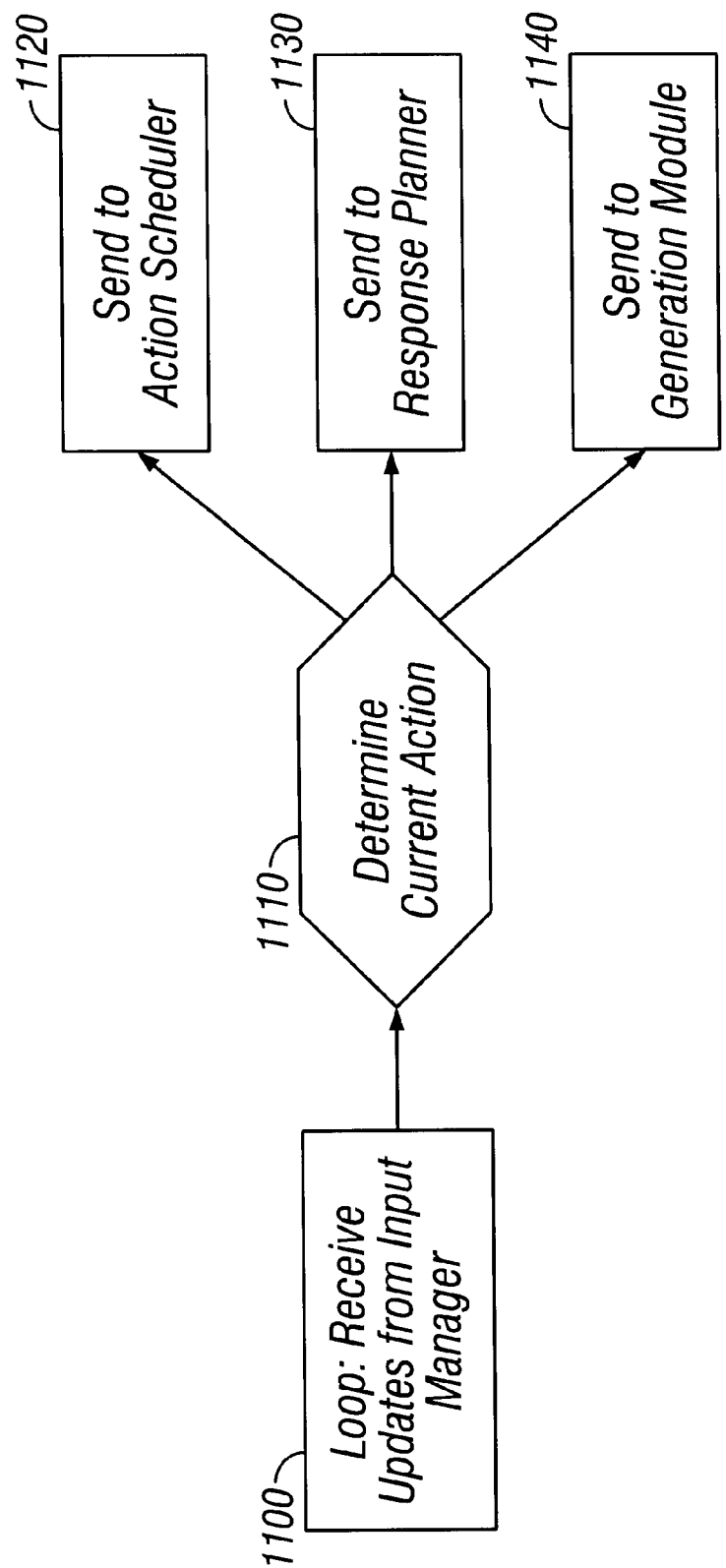
FIG. 11 is a flow diagram of operations of the reactive component.

An example implementation of the reactive module is illustrated in the flow diagram of FIG. 11. Via a loop 1100, the Reactive component constantly looks for inputs from the input manager and deliberative modules. A current action for each input (message) is determined 1110. If the message is tagged "immediate primitive", it gets sent directly to the action scheduler (see 1120). An example of this would be a message from the understanding module to start "listening" gaze behavior. If the message is tagged "immediate complex", it gets sent to the generation module (see 1140). An example of this would be a high-level message from the response planner to say something. If the message is tagged "future", it gets sent to the response planner for elaboration (see 1130). An example of this would be a message from the understanding module to plan a subdialogue (e.g. plan a sequence of actions/utterances to set up a conference call).

Interface with Response Planner

The reaction module sends the response planner a frame which represents a request for an action which requires a sequence of future actions to satisfy, along with a priority and time deadline. The Response Planner returns either a plan, represented by a sequence of time-tagged actions, or a notification that a plan could not be formed.

Interface with Generation Module

The reaction module sends the generation module frames describing complex actions it would like to have performed immediately, along with priorities and optional time deadlines for completion. The generation module will notify the reaction module when a requested action has either been completed or removed from consideration (e.g., due to timeout or conflict with a higher priority action). In one embodiment, personality, mood, and emotion biases or "hints" are encoded within the frames passed to the generation module and response planner.

Interface with Action Scheduler

The reaction module can send the action scheduler primitive action requests for directly controlling the character animation or external devices, along with a priority and optional time deadline for each. The action scheduler will notify the reaction module when a requested action has either been completed or removed from consideration (e.g., due to timeout or conflict with a higher priority action). One embodiment of a reaction module is illustrated by the flow chart of FIG. 11.

The Understanding Module

The understanding module 610 is responsible for fusing all input modalities into a coherent understanding of the world, including what the user is doing. To perform its task, the understanding module 610 receives inputs from the input manager 520, accesses knowledge about the domain (static knowledge base) and inferred from the current discourse (dynamic knowledge base), and also accesses the current discourse context (discourse model 720). The understanding module then applies a set of rules about how the inputs relate to each other in context with the current discourse and knowledge of the domain.

For example, the understanding module may apply a rule that gaze direction is a strong indicator of who/what is being spoken to. Therefore, if a user is (1) looking at the character, and (2) speaking, the understanding module infers that the character is being spoken to.

In addition, a process referred to as semantic fusing, may be applied where a meaning of a gesture and speech may be combined to determine a meaning to an entire communication. For example, a typing gesture (motioning as if typing at a keyboard) performed by a user, along with the words "I'll send it to you" would be fused to indicate that an e-mail was intended by the gesture and speech. Such a construction would likely be utilized anytime a gesture is combined with an ambiguous referring expression (noun phrase).

The understanding module 610 outputs one or more frames to the reactive module describing the inputs, and updates the discourse model. Certain types of ambiguity may not be resolvable by the understanding module, thus causing it to output a set of possible frames rather than a single one (for example, to allow the reactive module to ask the user a clarifying question).

The understanding module 610 performs both communicative and non-communicative (task) action understanding. Communicative understanding attempts to understand a communicative action taken by the user, and is performed by two sub-modules, the propositional understanding module and the interactional understanding module. The propositional understanding module integrates all available input modalities (e.g., body position, gaze direction, gesture recognition, speech) in an attempt to derive the propositional content of the user's semiotic gesture. The interactional understanding module has access to the same inputs, but is responsible for determining non-propositional content, such as information about turn-taking or back-channel communication (communications not in a main channel, head nodding during a conversation, for example). The non-propositional content is determined via a rule based system. Both sub-modules will be able to access and update the discourse model 720. A task understanding module may be utilized for understanding the non-communicative actions taken by the user (for example, recognizing that the user is attempting to plug in their laptop or is interrupting her conversation with the character to respond to a second human).

The understanding module will forward frames to the reaction module as they become available in an asynchronous manner. Frames representing ambiguity and partial frames will also be forwarded, for example, when a sentence is received but has more than one meaning and when the user does not complete a sentence, respectively.

While the responsiveness of the understanding module is important for responding to the user in a reasonable amount of time, its outputs will not be tightly coupled to the character animation update cycle, preferably permitting runtimes times of up to one or two seconds.

In one embodiment, the understanding module updates the dynamic knowledge (of knowledge base 710) directly. However, these results are also passed on to the reaction module which, in addition to acting on the information, may be configured to be entirely responsible for updating the dynamic knowledge base. The task understanding module may be configured to understand the user's intentions from observing their actions. In the case of ambiguity, the reactive module informs the understanding module that it could not process the (partial) frame it just sent and attempts to wait for the user to finish or correct their utterance.

Figure 12:
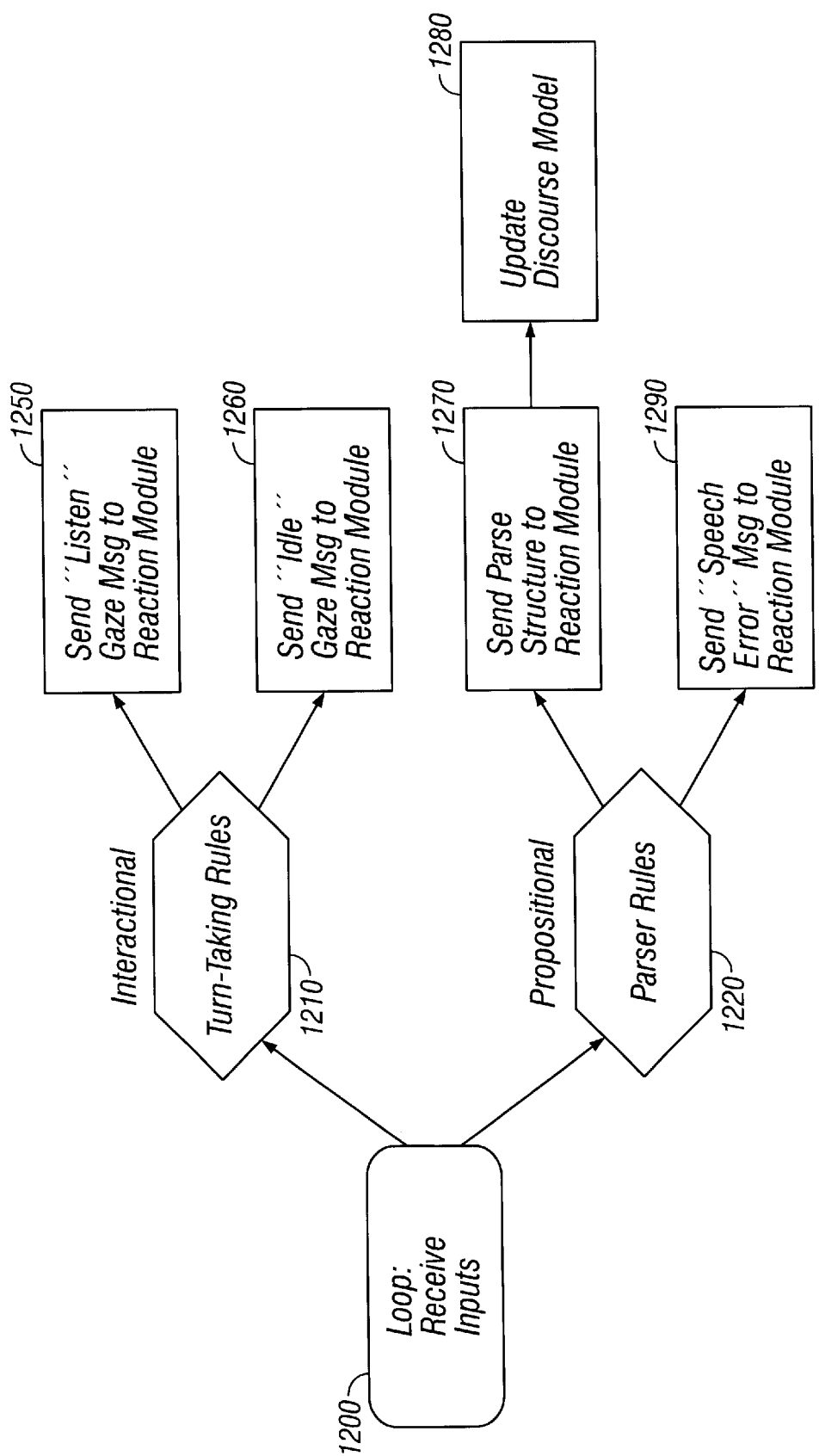
FIG. 12 is a flow diagram of an understanding module of the deliberative component.

One embodiment of the understanding module is illustrated in the flow chart of FIG. 12. This chart shows a simple implementation of an understanding module. It continuously receives inputs 1200 from the input manager, and depending on the input, engages either interactional 1210 and/or propositional 1220 rule sets. Example rules for interpreting the user's turn-taking cues are also shown. For example, if the input manager sends messages which reveal that the user is speaking and simultaneously looking at the conversational character, the turn-taking rules send a message to the reaction module to initiate "listening" gaze behavior 1250 (character looks at the speaker and follows his/her movements). On other inputs (e.g. no speech input), the turn-taking rules will send a message to the reaction module to initiate "idle" gaze behavior 1260 (random glances). When the understanding module receives inputs containing propositional data, such as a speech stream, it invokes a parser to determine the syntactic structure and semantic content of the message. If the speech can be parsed, a message containing a high-level semantic representation of its content is propagated to the reaction module, and the discourse model is updated 1280. If the speech cannot be parsed, a speech-error message 1290 is sent to the reaction module.

The Response Planner

The response planner is responsible for formulating sequences of actions, some or all of which will need to be executed during future execution cycles, to carry out desired communicative or task goals. The response planner is activated when the reaction module asynchronously sends it a frame representing an action to be performed. It then uses information in the static and dynamic knowledge bases (each incorporated in the knowledge base 710) and discourse model 720 (for communicative actions) along with knowledge of pending plans already created and unsatisfied goals, to synthesize a new plan which satisfies all unexpired, unsatisfied goals.

Figure 10:
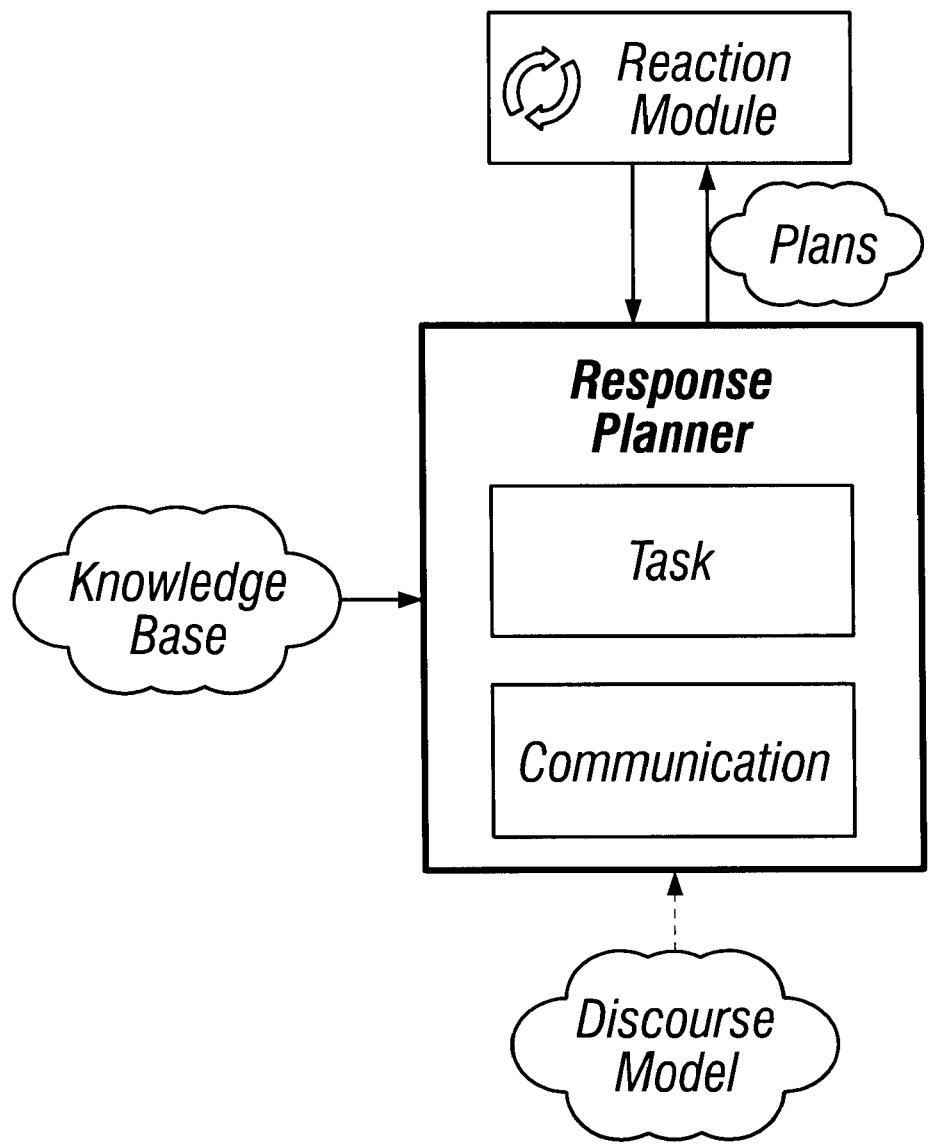
FIG. 10 is a block diagram of the response planner module.

In one embodiment the response planner is partitioned at the plan operator level into sub-modules for communicative and non-communicative (task) planning (see FIG. 10). The two types of planning are coordinated.

Response times for plans should be under one second although the system could occasionally take longer if complex re-planning is required. Due to planning algorithm complexity and the lack of hard real-time constraints, this module is preferably implemented in a symbolic language such as LISP. In one embodiment, the response planner and the reaction module are implemented in the same software.

Early designs had the response planner interfaced directly to the generation module so that once a plan was formed it could send action requests for the current cycle ($t_i$) directly to the generation module for realization and the action requests for future cycles ($t_{i+1}, \ldots$) to the reaction module. However, this is unnecessary since the plan returned to the reaction module can simply have its first step at $t_{i+1}$ (executed approximately $\frac{1}{30}^{th}$ second later by the reaction module). The early design produces an asymmetry in the architecture, since the response planner would also need to interface directly to the action scheduler in case there were any primitive actions to perform at $t_i$.

The Generation Module

The generation module 630 is responsible for realizing a complex action request from the Reaction Module by producing one or more coordinated primitive actions (e.g., speech generation, gesture, facial expression, "physical" action), sending the actions to the action scheduler 530 for performance, and monitoring their execution. The requested actions may be requested to be performed in parallel. For example, the generation module may request that the character say something, while doing a particular action, while another task is performed (such as a database function or task requested by the user).

If a requested action is not performed for some reason, then the generation module 630 must notify the reaction module so that a repair action can be planned if necessary.

In one embodiment, action requests made to the generation module are "ballistic" in the sense that they cannot be canceled by the reaction module once issued.

Figure 13:
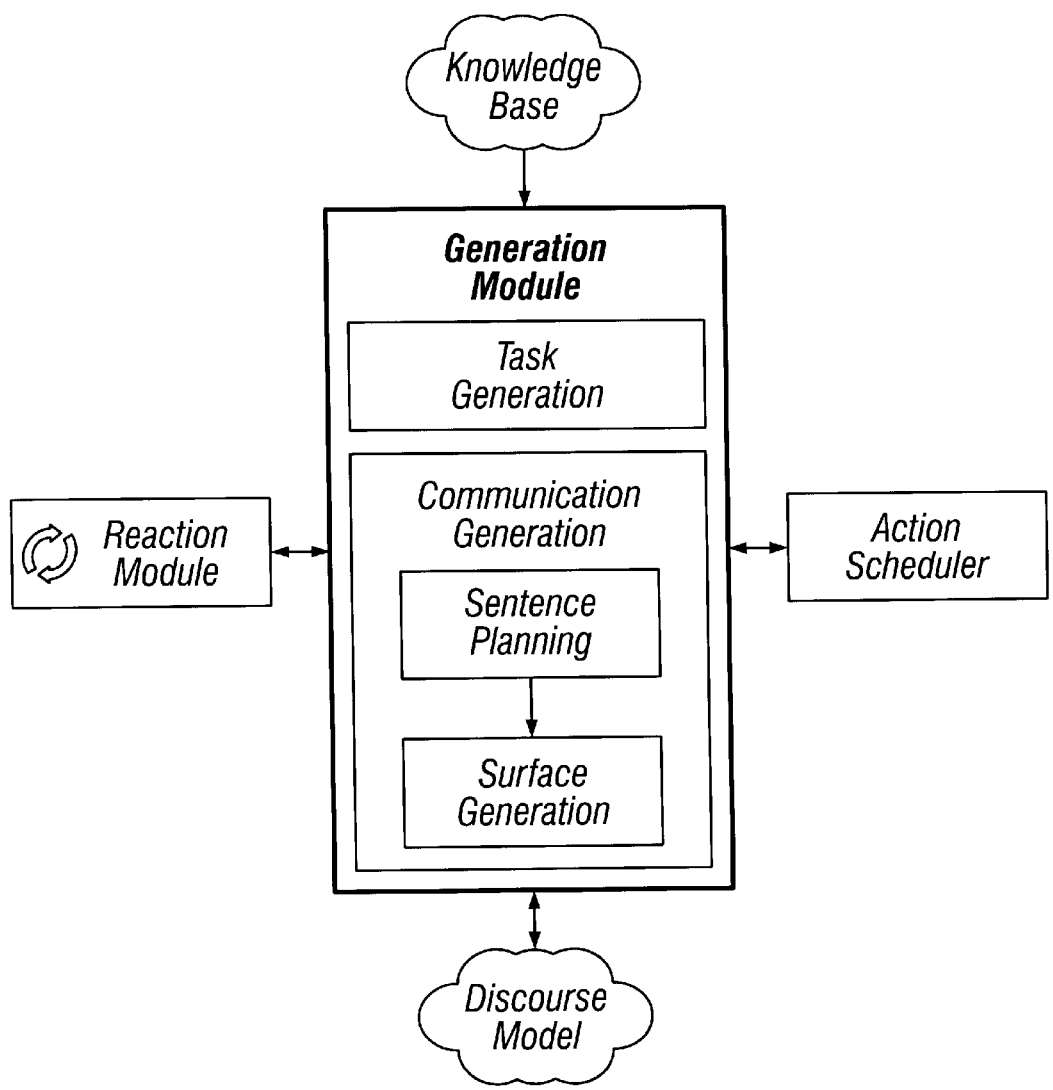
FIG. 13 is a block diagram of the generation module.

The generation module has two sub-modules, illustrated in FIG. 13: a task generation module, responsible for planning sequences of "physical" actions for the character; and a communication generation module, responsible for planning communicative actions.

In one embodiment, the communication generation module can be implemented as a template based system (sentences formed based on sentences with slots for filling in words derived from other sources such as the discourse model). In addition, the communication generation module itself has two components, a sentence planner, responsible for tasks like word selection, and a surface generator, which performs a reverse parse on a parse-tree-like structure to derive a string of words for the speech generator (other structures may be utilized).

Figure 15:
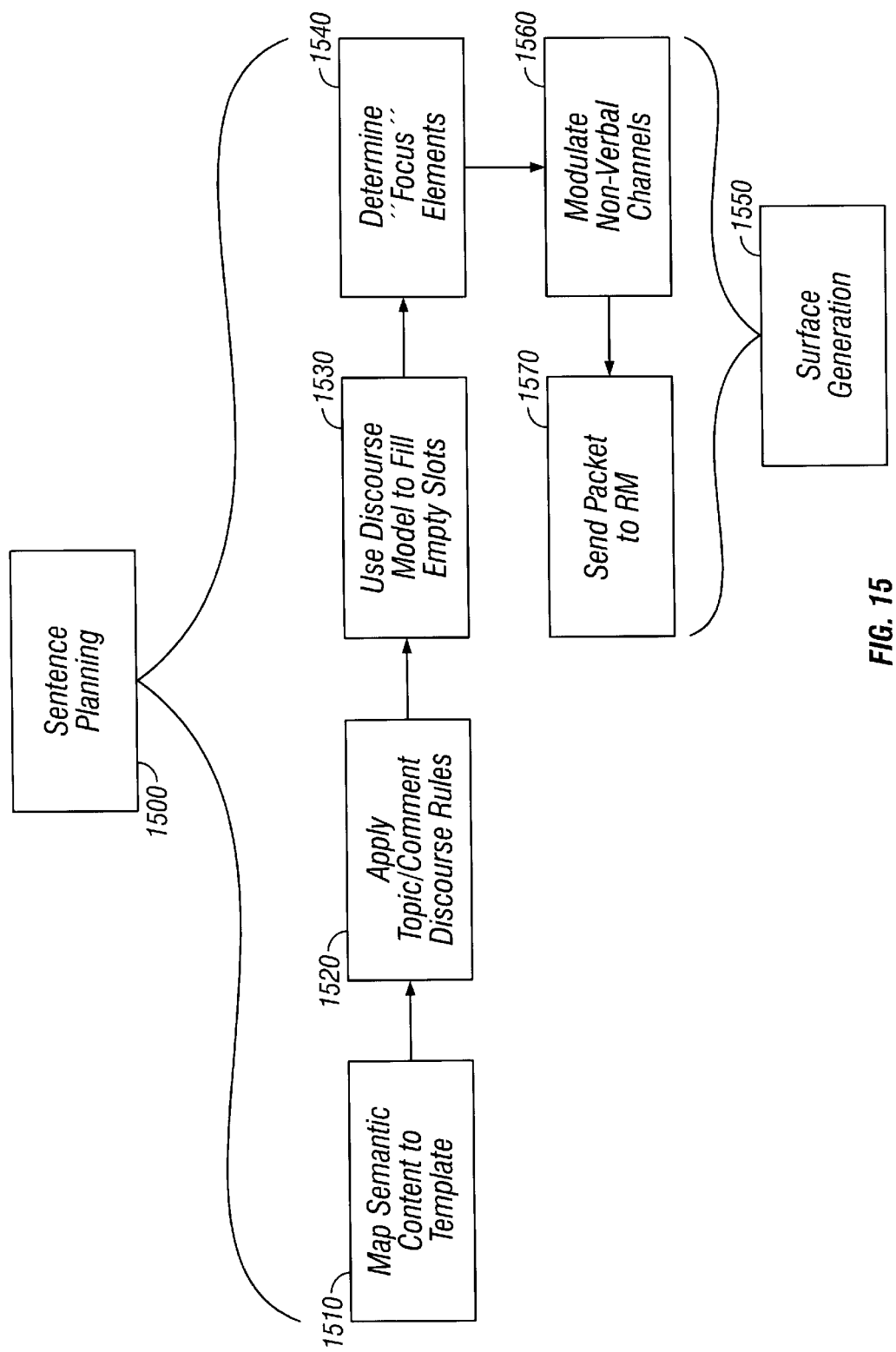
FIG. 15 is a flow chart of a generation module of the deliberative component.

A high-level representation of one embodiment of the generation module is illustrated in FIG. 15. The generation module is a linear process that takes a high-level semantic representation as input, and outputs a packet containing a string of words to be spoken and corresponding non-verbal behaviors to be performed. The process starts by matching the semantic representation against a set of templates 1510. The templates contain partially instantiated strings of words (e.g. "X is already turned on,"), a list of corresponding behaviors, and a partially instantiated semantic form (e.g. already-on(X)).

A template that matches the input is selected (e.g. the template indexed by "already-on(X)" would match the input "already-on(vcr)".) Each content (open-class) word (i.e. noun, verb, adjective, etc.) in the template string is matched against the discourse model 1520, and the string is divided into two parts: topic, the substring which includes the most recent words found in the discourse model, and the comment, the substring containing words not found in the discourse model, or words that have appeared less recently in the discourse model.

The empty slots (e.g. X in the example above) are filled in by matching against the input form (X matches vcr), consulting the discourse model, and selecting an appropriate instantiation 1530. For example, if "vcr" had been just mentioned, "it" would be selected. Otherwise, the full referring expression, "the vcr," would be selected.

Words in the fully instantiated utterance are then evaluated with respect to focus rules 1540 that determine which words are most salient. Words are considered to be in "focus" (most salient) when they occur for the first time (as determined by consulting the discourse model), or if they haven't been mentioned recently.

The last phase of generation involves modulating the nonverbal behaviors specified in the template 1560. This involves adjusting the alignment of gestural and facial expression peaks so that they co-occur with the "focused" words. At this point, an intonation (i.e. tune) is assigned to the words, with pitch accents (i.e. peaks in the fundamental frequency) also set to occur on focused words. Finally, the packet with the instantiated string of words and modulated behaviors is sent to the reaction module 1570.

Interface with Action Scheduler

The generation module can query the action scheduler to obtain a list of all pending actions, along with the priority and deadline for each, thus enabling it to select from primitive action alternatives while taking the current physical actions of the character into account. This also allows the generation module to preempt physical actions by requesting new uses for contending resources with a high priority. The generation module then sends the action scheduler low-level action requests for directly controlling the character animation or external devices, along with a priority and option time deadline for each. The action scheduler notifies the generation module when a requested action has either been completed or removed from consideration (e.g., due to timeout or conflict with a higher priority action, for example).

While the responsiveness of the generation module is important for responding to the user in a reasonable amount of time, its outputs need not be tightly coupled to the character animation update cycle, therefore permitting runtimes times of up to one or two seconds (a plan for coordinated utterances and gestures are sent in batch to the action scheduler once derived). In one embodiment, this module is implemented in Prolog or LISP, keeping the total runtime approximately within these example boundaries.

The Action Scheduler

The action scheduler 530 is the "motor controller" for the character, responsible for coordinating action at the lowest level. It takes multiple action requests from multiple requesters (i.e., the reaction and generation modules) and attempts to carry them out. Each action request has a priority and an optional deadline. If an action cannot be performed before its deadline it is discarded (and the requester is notified). If two actions conflict (require the same device resources), the one with higher priority wins (preemptively).

This module also interfaces with and manages the various output devices used by the system. These devices can be either logical (e.g., a linear interpolator in the animation model representing a single degree of freedom) or physical (e.g., the light settings in a conference room). When not performing an action, devices either remain in their current state or return to a default state.

Figure 14:
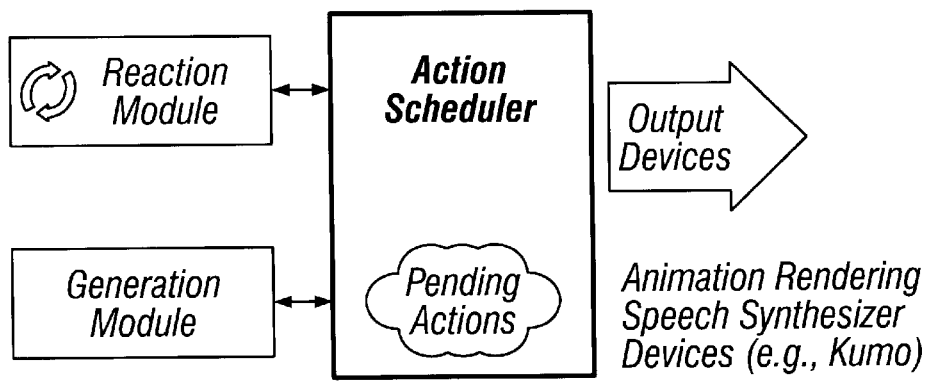
FIG. 14 is a block diagram of inputs, outputs, and pending actions of the action scheduler.

A block diagram of the response planner is shown in FIG. 14, which illustrates the interfaces with the reaction and generation modules, and storage of pending actions to be scheduled.

In order to maintain a smooth animation, it is preferred that the action scheduler run end-to-end within $1/30$ to $1/15$ seconds. In one embodiment, it is implemented in a procedural language such as C++ or Java. Since most output will be going to the animation rendering engine, the action scheduler and the animation rendering system may be integrated into the same executable.

Animation requests should be encoded as abstractly as possible to facilitate portability to different rendering systems. For example, facial expression commands such as "smile" are preferable to FACS (Facial Action Coding System). In one embodiment, the action scheduler receives "hints" which serve to bias its choice among realization options.

Knowledge Bases

State information, including application domain knowledge, is logically separated into the static knowledge base 710a, dynamic knowledge base 710b, and discourse model 720.

Static Knowledge Base

The static KB encodes the domain knowledge that the character "brings to the table" when it starts a new user dialog. It also includes a domain-specific lexicon and the character's personality profile.

Dynamic Knowledge Base

The dynamic KB (aka "blackboard") is the scratch memory used by the reaction, understanding, response planning and generation modules during a dialog. The dynamic KB maintains information such as a current location of a user, a current location of the character, and information identifying a point in a plan that relates to the current discourse between the user and character. This KB could easily be partitioned to maintain information of different categories or activities (activities taking place at different time scales, for example).

Discourse Model

The discourse model is used by the understanding, generation, and response planning modules to track the stack of discourse topics and other information used in processing natural language dialog. In one embodiment, the discourse model includes a tagged history of speech and the topic under discussion.

In one embodiment, each of the knowledge bases (KBs) and discourse model are implemented in the same software module. The static KB is realized as initialization data for the dynamic KB and domain-specific data for each of the modules. The dynamic KB is the working memory of the reaction module (e.g., the fact list in CLIPS/JESS); sharing with the understanding, response planning and generation modules can be accomplished through a request/reply protocol. The discourse model may be implemented either as part of the understanding or generation modules or, alternatively, may be contained within the dynamic KB.

Input Devices

Input devices for the present invention include, but are not limited to, the following:

Speech recognizer: several commercial products exist. Best candidates include Dragon Systems Naturally Speaking, IBM's ViaVoice, and Hauspie Speech Products' Voice Xpress.

Body position recognition/Gesture recognition: these two are closely related. Technologies include motion capture (magnetic and resistive, using a body suit, both commercially-available) and vision-based systems.

Gaze direction sensor ("eye tracker"): several commercial products exist for fixed-head application; The MIT Media Lab is working on a vision-based eye-tracking system.

User Identification: using face recognition software, tagging, or menu entry.

Keyboard: alternative to speech input.

Mouse: dragging the character around, dragging objects in the character's environment around, selecting menu options.

Motion detection: if we just want to determine whether something is moving in front of the computer.

Output Devices

Output devices for the present invention include, but are not limited to, the following:

Animation rendering: from ToonFace-style 2D animations in web page to high-end 3D characters in rich simulated environments. For 3D, the best cross-platform choice is something based on openGL. Cosmo3D (from SGI) is a good candidate rendering system which is based on top of openGL, provides Java-based rendering on either Windows or SGIs. Another candidate is Java3D. An interim candidate for simple 2D rendering which can be overlaid onto any Windows application is Microsoft Agent. Another possibility is Protozoal's "Alive" Real-Time 3-D animation system.

Speech synthesizer: candidates include TrueTalk, AccuVoice, and DECTalk. High quality and the ability to control intonation is preferred. A secondary criteria is the ability to synthesize different voices.

Other Devices or Software: characters may need to control software applications or hardware devices in the course of assisting the user to perform a task. The room controls in Kumo can all be commanded via text commands over an RS232 port in the AFX switcher.

Example Scenarios

The architecture of the present invention is provided to KUMO (a humanoid synthetic character), and the following presents a set of sample interactions, and walks through the processing steps and data flow in the architecture.

KUMO: "Is that Jupiter?"

1. Body tracker registers a user gesture towards Jupiter. User's body is facing the universe, but user is looking at KUMO. Speech recognizer detects that user has started talking.

2. The above information is available at the input manager; it forwards it to both the reaction and understanding modules.

3. Interactional understanding determines that user is taking a turn, and forwards a frame describing that fact to the reaction module.

4. Reaction module issues an immediate "attention" action to the action scheduler to show that KUMO is listening.

5. Action scheduler issues commands to the animation renderer to make KUMO look at the user and raise his eyebrows.

6. The speech recognizer outputs "Is that Jupiter" to input manager.

7. Input manager receives the string and forwards it to the reaction module and the understanding module.

8. Propositional understanding fuses the speech string with information from the user's gesture to create a frame for the user's query (something like "(ASK (BE <obj123> JUPITER))" ), forwards it to the reaction module and updates the discourse model.

9. Reaction module forwards the request to the response planner, since the required communicative response action might require multiple action steps (something like "(ASK (BE <obj123> JUPITER))" ).

10. Response planner determines that the user is actually pointing at Saturn, and decides that an appropriate response (based on information in the dynamic KB and discourse model) is to show the user Jupiter and say "No, you're pointing at Saturn. That is Jupiter.". The following plan is returned to the Reaction Module:

$t_{i+1}$ (TELL (POINT <user> SATURN))
$t_j$ (ACTION (SHOW <obj456> ))
$t_k$ (TELL (BE <obj456> JUPITER))

11. On the next update cycle (corresponding to $t_{i+1}$) the reaction module selects a Communication behavior (due to the bias produced by the plan step) and issues "(TELL (POINT <user> SATURN))" to the generation module for realization.

12. Communication generation produces the string "No. You're pointing at Saturn." and sends it the action scheduler along with lip-synch animation commands and animation commands to shake the head in time with the "No".

13. Action scheduler sends out the primitive commands to the animation renderer and the string to the speech synthesizer. Upon completion it notifies the generation module.

14. Generation module notifies the reaction module of successful completion and updates the discourse model.

15. On the next update cycle (corresponding to $t_j$), the reaction module selects a DomainAction behavior (due to the bias produced by the plan step) and issues "(ACTION (SHOW <obj456>))" directly to the action scheduler (since it is a primitive action).

16. Action scheduler sends a command out to the solar system simulation to display Jupiter. Upon completion it notifies the reaction module.

17. On the next update cycle (corresponding to $t_k$), the reaction module selects a Communication behavior (due to the bias produced by the plan step) and issues "(TELL (BE <obj456> JUPITER))" to the generation module for realization.

18. Communication generation produces the string "That is Jupiter." and sends it to the action scheduler along with lip-synch animation commands and animation commands to produce a deictic gesture towards the solar system display.

19. Action scheduler sends out the primitive commands to the animation renderer and the string to the speech synthesizer. Upon completion it notifies the generation module.

20. Generation module notifies the reaction module of successful completion and updates the discourse model.

Plans

As discussed above, plans represent a sequence of actions (steps) that are implemented to achieve a discourse goal. The plans represent future actions and are utilized to influence behavior of the reaction module.

Figure 16A:
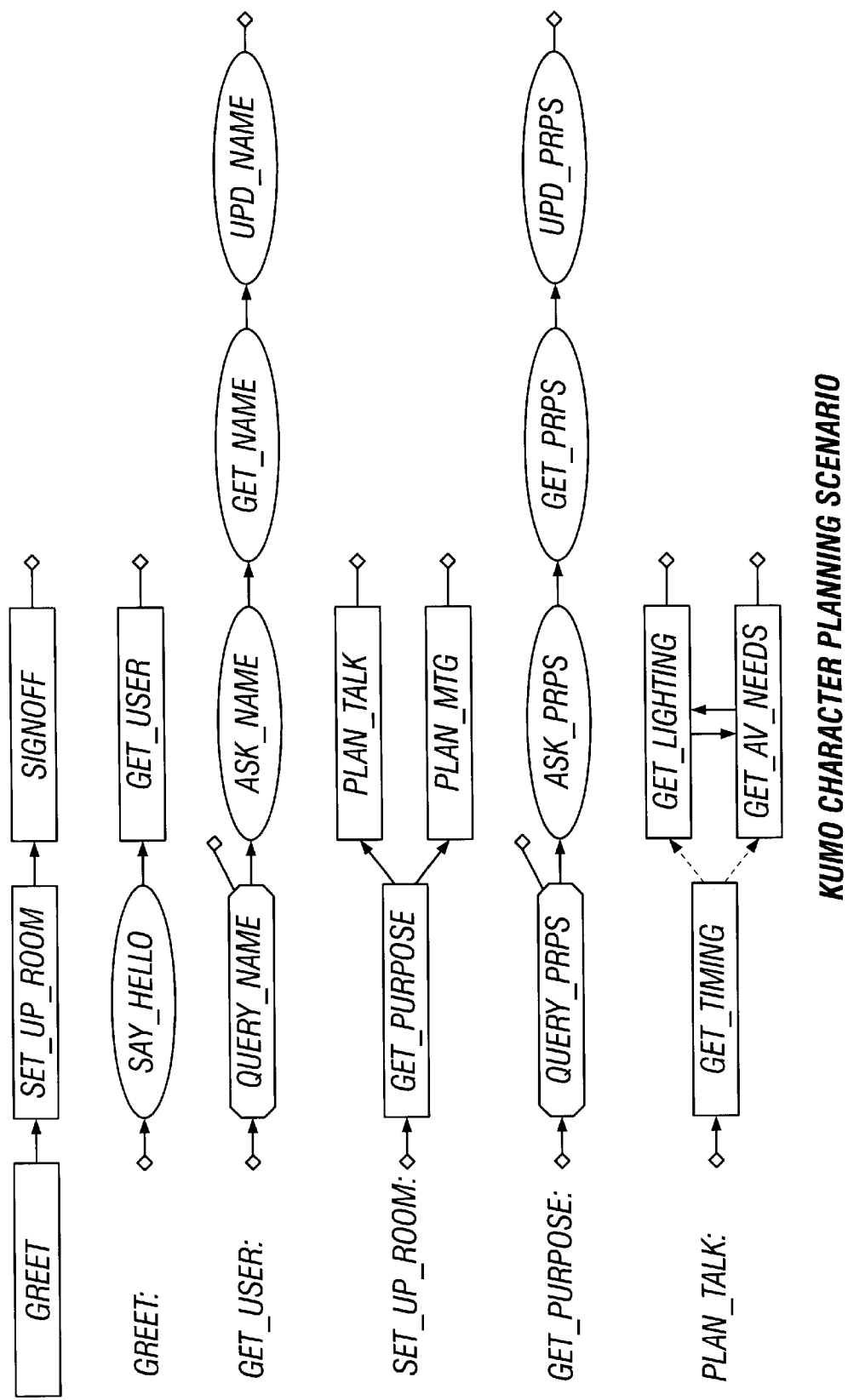
FIG. 16 is an example plan.
Figure 16B:
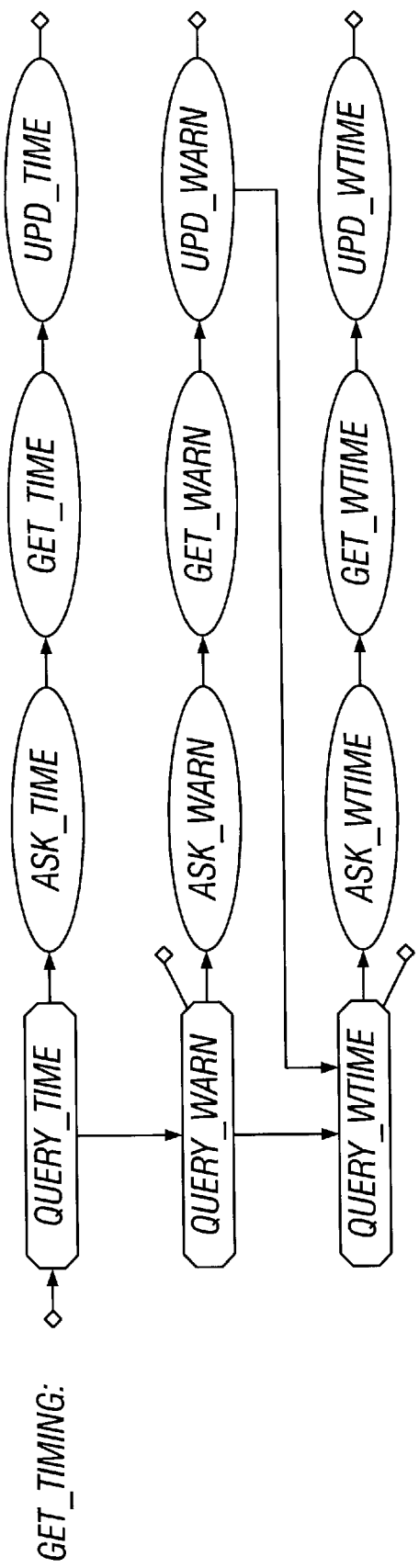

FIG. 16 illustrates an example plan for the discourse goal of helping a user set up a conference room. The discourse basically greets the user (GREET) and sets up the room (SET_UP_ROOM). Each of these steps are further divided into sub-plans (GET_USER, for example, which gets the user's name for future reference). The plan provides a basic framework on how the discourse should proceed, absent intervening circumstances, and how the discourse should continue after an intervening circumstance (an interruption for coffee, for example).

Behavior Synchronization

The action scheduler of the present invention may synchronize gesture and speech using either absolute time stamps or speech strings with embedded gesture commands. However, the use of absolute time stamps is error prone because the time lag between issuing the speech synthesizer a string and its starting actual production can vary widely from call to call on many platforms, and because estimating the duration of speech or gesture segments is difficult to do precisely. The use of speech strings with embedded gesture commands helps synchronize the start of gestures with specified speech segments, however, provisions are lacking for flexibly chaining gestures together and synchronizing the start of an utterance on other conditions (e.g., point at the door, look at the user, then say "right this way, please."). In addition, once planned behavior sequences have begun, it is preferred that the Reaction Module be notified of the completion of motor sequences by the action scheduler in order to sequence through a plan (another option is to use open loop, timed control, which is also error prone).

The Microsoft Speech Software Developer Kit Application Program Interface (SDK API, as well as the Java Speech API) provides for call backs from a speech synthesizer during production of a given utterance which can be used to achieve much more reliable and accurate synchronization than absolute time stamps. In particular, the API provides for phoneme call backs, which the synthesizer uses to notify an application as each phoneme is produced, and word-boundary call backs, which the synthesizer uses to signal the start of production on each word. The phoneme call backs also provide information about the phoneme being produced, and can thus be, used to solve the character lip-synch problem by having the synthesizer directly manipulate the character's mouth during production. Since gestural events generally occur on word boundaries, the word boundary call backs can be used to tightly synchronize gesture, facial expression, and other animation outputs with speech.

The action scheduler of the present invention (the behavior and command protocol of the action scheduler) may also be designed to allow the Reaction and Generation Modules to specify behavior sequences (including gesture and speech segments) in terms of condition-action pairs, in which the conditions are specified relative to events (such as speaking the nth word or completing a gesture) and the actions either begin new behaviors, end behaviors, or send notifications back to the Reaction Module.

Behavior Control

At a low level, control of the animated character consists of individual "analog" control knobs, which manipulate the rotations of joints and the locations of objects and features (such as hands and eyebrows). Each of these control knobs-Degrees of Freedom (DOFs)-are set and the character re-rendered at 10 Hz or better to achieve smooth animation.

Above this layer of control are atomic procedures-behaviors-which move one or more DOFs incrementally over a number of update cycles to achieve an animation. There are fundamentally two styles of commanding behaviors: discrete and continuous. The discrete style of control involves formulating a sequence of commands to be executed, each of which has a specified start time and duration, and handing the sequence off to the animation system for execution.

The continuous style of control involves instructing the animation system at every update cycle (e.g., I 10 Hz or better) which behaviors are to be kept running. For example, to move forward, commands "WALK FORWARD", "WALK FORWARD", etc., are present over a series of consecutive update cycles until the character has reached its destination, at which time the commands simply stop being issued. Thus, in the continuous update style of animation control, behaviors do not have fixed durations, they simply continue to incrementally execute as long as the command is present.

The present invention utilizes both styles of control in different situations. When commanding a communicative act—a tightly synchronized sequence of utterances, gestures, and expressions—a discrete style of control is preferred. However, the continuous style of control is preferred when commanding "secondary" motion, such as idle behaviors, walking, occasional blinking, and other behaviors which are essential to maintaining a lifelike quality, but would present additional complexity in the Reaction Module if it had to plan out discrete actions for each of these. The process style of control is actually more general, since discrete control can be achieved via behaviors which simply perform a discrete action and then do not update their DOFs once it has completed.

Other issues in behavior control are behavior blending, conflict resolution and transitions. For example, one behavior may be defined for mouthing a particular phoneme and another for smiling. In the case where both behaviors are simultaneously requested, the behaviors each want to manipulate the mouth DOFs. In one embodiment, behaviors are blended together. For example, the character talks with the corners of the mouth upturned (or at least biased in that direction). In another embodiment, only one behavior can use a given DOF during a single time span. However, the later embodiment gives rise to problems of conflict resolution among behaviors competing for the same DOF which may be resolved through another mechanism (fixed priorities, or a weighting scheme, for example).

Another issue is how the animation smoothly transitions the DOF settings from one behavior to another. Two simple solutions are to have behaviors return their DOFs to a canonical resting position before they release control or simply interpolate the position of each DOF from its location at the start of a behavior to the first landmark or keyframe position specified for the behavior.

TABLE 5

BEHAVIORS IMPLEMENTED IN THE ACTION SCHEDULER

| Behavior | DOFs | Invocation | Notes |
| --- | --- | --- | --- |
| Notify | none | (notify <any>) | Sends a notification message to the RM. |
| Speak | speechDOF | (speak:content<string>) | Only responds to ONCE and End commands. |
| HeadLook | headDOF | (headlook:cmd towards/away) | |
| HeadNod | headDOF | (headnod) | CONT command repeatedly nods. |
| Eyebrows | eyesbrowsDOF | (eyebrows:cmd raise/lower) | |
| EyeLook | eyesDOF | (eyelook:cmd towards/away) | |
| RightGesture | rightArmDOF | (rightgesture:cmd ready/relax/wave/raisel point [:dur <time>]) | |
| LeftGesture | leftArmDOF | (leftgesture:cmd ready/relax/wave/raisel point [:dur <time>]) | |
| Idle | eyesDOF, eyebrowsDOF, headDOF, bodyDOF, speechDOF | (idle:user attending/notattending | |

In one embodiment, behavior blending is not supported and only one behavior has control of a DOF at a time. Resource contention is handled through command priorities; a command to start a behavior can specify a priority (default zero) which is assigned to the behavior once running. A subsequent command with a higher priority which needs one of the DOFs owned by the running behavior will preempt the running behavior, causing it to terminate. Similarly, a subsequent command with a lower priority is simply ignored.

Every behavior has an initialization routine, a "logical termination" (for a continuous command, this might just be some arbitrary number of update cycles), and a wrap-up routine (which provides the behavior with an opportunity to return its DOFs to their resting position over some number of update cycles).

In one embodiment, a behavior can be sent one of three commands at any given time:

ONCE—The initialization routine is called, after which the behavior will be incrementally updated on each following cycle until it reaches its logical termination, at which time it will begin its wrap-up routine and then terminate (releasing the DOFs).

CONT—(Continuous) If the behavior is not currently active, the initialization routine is run. On every following cycle the behavior will be incrementally updated. (Discrete-style behaviors, such as "HANDS TO GESTURE SPACE" will likely maintain their end position until the behavior is canceled.)

END—The behavior immediately begins executing its wrap-up routine, after which it will terminate.

Synchronization

The present invention provides synchronization between speech and gesture. Commands sent to the action scheduler are qualified with an event expression which describes when they are to be executed, rather than explicitly specifying the start time for each (although, this command style is also supported). Event expressions can be arbitrary combinations of temporal relations and conditions on speech synthesizer and animation events, for example. Each command will be executed once, or in part, if at all, on the first update cycle in which its event expression evaluates to true.

Example event expressions:

IMMEDIATE Do it now.

(on :event 14:01:32.143) Do it at the specified time.

(and :1(on:eventB1END) Do it when the behavior labeled B1

:2(before :event 14:01:32.143)) completes, as long as it is before the specified time.

Open Loop vs. Closed-Loop Control

The Reaction Module is notified when certain events occur in the output devices, in order to sequence through the next step in a communication plan (for example). Although it is possible to do this in an open-loop fashion, using timing estimates etc., it is much more accurate and straightforward to have the action scheduler notify the Reaction Module when certain pre-defined events occur. The command language described has been extended to handle this through the use of the NOTIFY command, which sends a message to the Reaction Module when executed. The entire NOTIFY frame is sent to the Reaction Module, allowing arbitrary parameters to be passed as attributes on the NOTIFY frame.

Example callback when two labeled behaviors have completed:

(action: when (and :1 (after:event B1.END)
(after :event B2.END))
  :cmd once :content (notify :id N1))

Action Scheduler Command Performative

One basic problem in extending the KQML Performative syntax to handle synchronized events is that it represents speech and gesture in fundamentally different ways; the former is encoded at the top level of the COMMACT frame as a proposition with an embedded speech string, the latter is encoded down several levels in either the :INPUT or :OUTPUT attributes. While this works as long as synchronization is achieved through absolute time stamps, it makes event-based synchronization specification more difficult. Ideally, speech and gestures (and other actions) should be specified as peer behaviors whose execution can be conditioned upon each other. For example, it may be specified that the right arm be raised, when the arm has finished moving that the character say "Hello, my name is Kumo" have the character gesture towards itself when it pronounces "Kumo", and then drop the hand following the last gesture.

Table 6 provides an action scheduler command protocol according to the present invention. The command protocol is defined in a manner designed to meet the above-stated requirements.

TABLE 6

```
(tell :sender RMIGM :recipient AS :content <commact>)
<commact> ::=
    (commact     :sender <word>
        :recipient <word>
        :prop <prop frame>       //Propositional
        :intr <list>             //Interactional
        :output '['  <action_frame>* ']' )
        //AS only looks at :output.
<prop-frame> ::= //':speech' attribute removed.
        (decl :given LIST :new . . .     |
        (int :given LIST :new . . . )   |
        (imp :given LIST :new . . . )
<action – frame> ::=     //Used for outputs only.
        <start_action_frame> | <end_action_frame>
<start_action_frame> ::=
    (action     :id <event id word>
        :when immediate | <when-frame>
        :cmd once | cont
        :content     <behavior_frame>
        :priority <long>)
<end-action-frame>
    (action
        :when immediate | <when_frame>
        :cmd end
        :content    <event_id_word>
        :priority <long>)
<when-frame> ::=
    (after :event <event>) |
    (before :event <event>) |
    (on :event <event>) |
    (and :1 <when frame> :2 <when frame>)
    (or :1 <when – frame> :2 <when-frame>)
    (not :1 <when-frame>)
<event> : :=
    <absTime> |
    <event_id_word>.START |
    <event_id_word>.END |
    <event_id_word>.<subEvent _id_word> |
    (offset_after    :event <event_id_word>
                     :time <offsetTime>)
<behavior frame> ::=    //Current set implemented.
    (notify {<attribute> <value>}*) |
    (speak :content <string>)    |
    (headlook :cmd towards|away)    |
    (headnod)    |
    (eyebrows :cmd raise|lower)
    (eyelook :cmd towards|away)
    (rightgesture    :cmd ready|relax|wave|raise|point
                     [:dur <time>])
    (leftgesture    :cmd ready|relax|wave|raise|point
                     [:dur <time> )
    (idle :user attending|notattending)
```

As indicated in Table 6, a behavior can optionally be labeled with a WORD (<event_id_word>). Such a behavior will generate an event when it starts (<event_id_word>.START) and ends (<event_id_Word>.END). The label can also be used to halt the behavior (using the END command). In addition, a labeled speech behavior will generate events of the form <event_id_word>.WORD<i>as each word is produced (where WORD0 is generated just as the first word is produced). Note that in this scheme behavior frames no longer need duration (:dur) attributes, and the distinction between state (:state) and transitory (:trans) behaviors need not be specified (these are achieved by using a ONCE or a CONT command, respectively).

The above specification is no longer symmetric in input and output surface form representations, but this reflects reality. Inputs arrive with absolute time stamps and probabilities; outputs are formulated with event-based specifications and priorities.

Example

The following are example values for a behavior commact/: output attribute.

1. Action deadlines (i.e., if an action cannot be performed by a deadline, then it is never performed).

[(action :when (before :event 14:01:32.143): cmd once
      :content ( . . . ))]

2. Process behavior.

[(action :when immediate :cmd cont :content ( . . . ))]

3. Speech with gesture (raise and lower hands):

[(action :id B1 :when immediate :cmd once
      :speech "Sorry, I didn't get that.")
   (action :id B2R :when (on :event B1.START) :cmd cont
      :content (rightgesture :cmd raise)
   (action :id B2L:when (on :event B1.START) :cmd cont
      content (leftgesture :cmd raise)
   (action :when B1.END :cmd end content B2R)
   (action :when B1.END :cmd end content B2L)]

4. Speech with deictic gesture:

[(action :id B1 :when immediate :cmd once
      :content (speech content "The tape player is
         in the podium."))
   (action :when B1.WORD5 :cmd once content
      (rightgesture :cmd point))]

Additional embodiments of the present invention include an idle condition and behavior blending. For example, :when (idle DOF <name>) condition, which allows a behavior to be started as soon as a DOF becomes available (e.g., to begin execution of idle routines).

Regarding behavior blending, it is common for beats to be blended with other gestures (particularly in their preparation and relaxation phases). Proper coarticulation may be produced via a blending model. However, this effect may be realizable by simply parameterizing gesture behaviors or some other technique short of true blending of motor controls.

The present invention as discussed herein has been described in reference to a conversational and synthetic character interface. However, the present invention may be applied to numerous conversational or synthetic characters concurrently in a same interface. In addition, the teachings of the present invention apply to any type of animated interface or presentation device (virtual classroom instructor, or tutor, for example) or other animated devices or icons. The present invention may be used as a computer interface or for directing operations of any type of equipment of varying configurations (televisions, VCR's, stereos, to figures, radar devices, mechanical equipment such as heavy machinery, and building management/maintenance devices as just a few examples).

This detailed description includes example portions of code. However, the example portions of code are not intended to be either a compilable or executable program or program design language or contain all the features discussed herein, but are merely illustrative of techniques described herein and provided as examples.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the processing of the present invention. Such software may include, but is not limited to, device drivers, peripheral equipment programs, operating systems, and user applications. Ultimately, such computer readable media further includes software for performing the functions of the present invention as described above.

Included in the programming (software) of the general/specialized computer or microprocessor are software modules for implementing the teachings of the present invention, including, but not limited to, input and identification of user inputs, deliberative and reactive processing, retrieval of knowledge and discourse models, scheduling of actions in response to the inputs and other processing, and implementing the actions scheduled via movements and speech of a synthetic character or other animation.

Obviously, numerous modifications and variations of the present invention are possible in light of the above teachings. It is therefore to be understood that within the scope of the appended claims, the invention may be practiced otherwise than as specifically described herein.

What is claimed is:

1. An interactive user interface for allowing a user to interact with a system, comprising:
   a display device, for use in displaying to the user a visible representation of a computer generated virtual space, including an animated virtual character therein;
   a plurality of input devices, for use in accepting data defining a physical space domain, said physical space domain including the physical space occupied by the user;
   an input manager for use in obtaining said data from said input devices, calibrating movements detected in said physical space domain to corresponding coordinates in said virtual space, and converting said data into an input frame representing a coherent understanding of said physical space domain and the action of said user within said physical space domain;
   a knowledge base, for storing physical space domain data, including action inputs by the user within and in relation to said physical space domain, and for further storing actions by the virtual character within the virtual space;
   a discourse model that contains state information about a dialogue with said user;
   an understanding module for use in receiving inputs from the input manager, accessing knowledge about the domain inferred from the current discourse, and fusing all input modalities into a coherent understanding of the users environment;
   a reactive component for receiving updates from the input manager and understanding module, and using information about the domain and information inferred from the current discourse to determine a current action for said virtual character to perform;
   a response planner for use in formulating plans or sequences of actions;
   a generation module for use in realizing a complex action request from the reactive component by producing one or more coordinated primitive actions, and sending the actions to an action scheduler for performance; and,
   an action scheduler for taking multiple action requests from the reaction and generation modules and performing out said requests.

2. The interactive user interface according to claim 1, further comprising multiple input channels, each of said channels configured to transfer at least one of said user inputs to the interface.

3. The interactive user interface according to claim 2, wherein said multiple input channels are configured to capture at least one of speech, body position, gaze direction, gesture recognition, keyboard inputs, mouse inputs, user ID, and motion detection of said user.

4. The interactive user interface according to claim 2, further comprising:
   a microphone configured to capture speech of said user;
   a video camera configured to capture at least one of gestures, body position, and gaze direction of said user;
   a compass attached to said user and configured to capture a direction of said user; and,
   wherein said multiple input channels include,
      a microphone input channel connected to said microphone,
      a video input channel connected to said video camera, and
      a direction input channel connected to said compass.

5. The interactive user interface according to claim 2, wherein said input frame synchronizes data from each of said user inputs with a virtual environment containing said character.

6. The interactive user interface according to claim 2, wherein said multiple input channels include at least one input channel connected to and configured to transmit data from at least one of a motion detector, cyberglove, cybergloves, and body tracking hardware to said input manager.

7. The interactive user interface according to claim 1, wherein:

said interaction by said synthetic character with said physical space includes at least one of pointing and gesturing by said synthetic user interaction character toward an object in said physical space.

8. The interactive user interface according to claim 1, wherein:

an operation of said display includes an interaction of objects in said physical space with said virtual environment that may include at least one of pointing and gesturing by an object or person in said physical space toward an object in said virtual environment.

9. A method of allowing a user to interact with a system, comprising the steps of:

displaying to the user, using a display device, a visible representation of a computer generated virtual environment, including an animated virtual character therein;

accepting, using a multi-modal input, data defining a physical space domain distinct from said virtual environment, said physical space domain including the physical space occupied by the user and the visible representation of said virtual environment;

mapping, in a knowledge base, physical space domain data, and actions by the user within the physical space domain, to an interaction with the virtual environment, and for mapping actions by the virtual character within the virtual environment to said visible representation, such that when displayed on the display device the actions of the virtual character are perceived by the user as interacting with the physical space occupied by the user; and, generating, in response to a user input to the system, an action to be performed by said virtual character, using both deliberative processing and reactive processing, wherein said deliberative processing includes the substeps of fusing portions of the user inputs into a coherent understanding of the physical environment and actions of the user, updating a discourse model reflecting current and past inputs retrieved from the user, and, outputting to the reactive processing a frame describing the user inputs, and wherein said reactive processing includes the substeps of receiving updates of user inputs and frames concerning the user inputs from said deliberative processing, accessing data from a knowledge base about said domain and about a current discourse between the user, physical environment, and virtual space, and, determining a current action for the virtual space.

10. The method according to claim 9, wherein said step of fusing includes the steps of applying a set of rules that define how said inputs affect each other.

11. The method according to claim 9, wherein said step of fusing includes the steps of:

identifying a user gesture captured by said inputs; and, determining a meaning of a user speech captured at least one of contemporaneously and in close time proximity of said user gesture.

12. The method according to claim 11, wherein said step of generating an action further comprises the steps of:

scheduling an appropriate system response based on said understanding; and, updating a discourse model based on the retrieved inputs.

13. The method according to claim 12, wherein said step of updating comprises:

maintaining a tagged history of speech of said user, including the step of:

identifying said discourse model with at least one of a topic under conversation between said user and said virtual environment and other information received via either of said deliberative and reactive processing.

14. A user interface for a computer system that allows a user to communicate with the system in an interactive manner, comprising:

a display device, for use in displaying to the user a visible representation of a computer generated virtual environment, including an animated virtual character therein;

a multi-modal input, for use in accepting data defining a physical space domain distinct from said virtual environment, said physical space domain including the physical space occupied by the user and the visible representation of said virtual environment;

a knowledge base, for use in mapping physical space domain data, and actions by the user within the physical space domain, to an interaction with the virtual environment, and for mapping actions by the virtual character within the virtual environment to said visible representation, such that when displayed on the display device the actions of the virtual character are perceived by the user as interacting with the physical space occupied by the user; and, a response processor, that integrates deliberative and reactive processing performed on user inputs received by said multi-modal input, wherein said response processor includes a scheduler for scheduling an appropriate system response based on an understanding of said physical space domain and actions of the user, a discourse model based on the retrieved inputs, a tagged history of speech of said user, and a response planner for identifying said discourse model with at least one of a topic under conversation between said user and said virtual environment, wherein said response processor further includes a deliberative component and a reactive component, wherein said deliberative component is configured to fuse portions of the user inputs into a coherent understanding of the physical environment and actions of the user, updating a discourse model reflecting current and past inputs retrieved from the user, and outputting to the reactive component a frame describing the user inputs, and, wherein said reactive component is configured to receive updates of user inputs and frames concerning the user inputs from said deliberative processing, accessing data from a knowledge base about said domain and about a current discourse between the user, physical environment, and virtual space, and determining a current action for the virtual space.

15. The interface according to claim 14, wherein:

said multi-modal input comprises multiple input channels each configured to capture at least one of said user inputs, and an input manager configured to integrate the user inputs from said multiple input channels and provide said integrated user inputs to said deliberative processing component.

16. The interface according to claim 15, wherein said multiple input channels include at least one of speech, body position, gaze direction, gesture recognition, keyboard, mouse, user ID, and motion detection channels.

17. The interface according to claim 16, wherein each of said multi-modal input, said deliberative processing, and said reactive processing operate in parallel.

18. The interface according to claim 17, wherein said reactive processing provides reactive output to said output mechanism immediately upon receiving a predetermined input from said input device.

19. The interface according to claim 16, wherein said reactive processing provides reactive output to said output mechanism upon receiving a predetermined input from said deliberative processing.

20. The interface according to claim 19, wherein:

said predetermined input is speech by a user; and, said reactive output is a command to initiate a conversational gaze on said synthetic character.

21. The interface according to claim 17, wherein said deliberative processing component comprises:

an understanding module configured to fuse inputs from said multi-modal input and determine a coherent understanding of both a physical environment of the user and what the user is doing;

a response planner configured to plan a sequence of actions based on said coherent understanding; and, a response generation module configured to implement each real time response and complex action formulated by said reactive component.

22. The interface according to claim 17, wherein:

said multiple input channels include at least one channel configured to transmit a speech stream input by said user, and at least one channel configured to transmit any combination of at least one additional user input, including, body position, gaze direction, gesture recognition, keyboard, mouse, user ID, and motion detection; and said deliberative processing component includes a relation module configured to relate at least one of the additional user inputs to said speech stream.

23. The interface according to claim 17, further comprising an action scheduler that controls said synthetic character according to said real time responses and said complex actions in a manner that interacts with said user.

24. The interface according to claim 21, wherein said response generation module initiates parallel operations of at least one of said responses by said synthetic character.

25. The interface according to claim 24, wherein the initiated parallel operations include at least one of speech output by said synthetic character, an action performed by said synthetic character, and task to be performed on said computational system.

26. The interface according to claim 24, further comprising an action scheduler that controls an animation that displays said interface in a manner that interacts with said user and performs actions requested via said user inputs, wherein:

said user inputs include at least one of speech, gestures, orientation, body position, gaze direction, gesture recognition, keyboard, mouse, user ID, and motion detection;

said deliberative processing utilizes at least one of said user inputs to implement a complex action; and, said reactive processing formulates a real time response to predetermined of said user inputs.

27. The interface according to claim 24, wherein said deliberative processing component includes, as part of said deliberative processing, a multi-modal understanding component configured to generate an understanding of speech and associated non-verbal of said user inputs, a response planning component configured to plan a sequence of communicative actions based on said understanding, and, a multi-modal language generation component configured to generate sentences and associated gestures applicable to said sequence of communicative actions.

28. A method for allowing a user to interface with a computer system, comprising:

displaying to the user, using a display device, a visible representation of a computer generated virtual environment, including an animated virtual character therein;

accepting, using a multi-modal input, data defining a physical space domain distinct from said virtual environment, said physical space domain including the physical space occupied by the user and the visible representation of said virtual environment;

mapping in a knowledge base, physical space domain data, and actions by the user within the physical space domain, to an interaction with the virtual environment, and for mapping actions by the virtual character within the virtual environment to said visible representation, such that when displayed on the display device the actions of the virtual character are perceived by the user as interacting with the physical space occupied by the user; and, generating, using a response processor, in response to a user input to the system, an action to be performed by said virtual character, including the substeps of interpreting said user input data and said physical space information data and generating a user input context associated with said input, determining a system response in response to said user input and said user input context, wherein said step of determining a system response includes the steps of formulating real time responses to a predetermined set of said inputs by reactive processing; and, formulating complex actions based on said inputs by deliberative processing, and wherein said deliberative processing includes the steps of determining an understanding of said physical space domain and actions of the user, scheduling an appropriate response based on said understanding, updating a discourse model based on the retrieved inputs, and communicating said understanding to said reactive processing;

wherein said step of determining an understanding, comprises the steps of:

combining selected of said inputs into a frame providing a coherent understanding of said physical space domain and actions of said user, including the steps of, accessing a static knowledge base about a physical space domain with reference to said selected inputs;

accessing at least one of a dynamic knowledge base and a discourse model to infer an understanding of a current discourse between said user and said virtual environment;

accessing a discourse model to infer an understanding of said current discourse; and, combining information from at least one of said static knowledge base, said dynamic knowledge base, and said discourse model to produce said frame.

29. The method according to claim 28, wherein said step of mapping in a knowledge base comprises the steps of:
maintaining information identifying where said user is located within said physical space domain;
maintaining information identifying at least one of a position and orientation of at least one of a character and object displayed in said virtual environment; and,
tracking placement in a plan being implemented by a programming of said virtual environment.

30. The method according to claim 29, wherein said reactive processing includes the steps of:
receiving asynchronous updates of selected of said user inputs and understanding frames concerning said user inputs from said deliberative processing;
accessing data from a static knowledge base about said physical space domain and a dynamic knowledge base having inferred information about a current discourse between said user, said physical space domain, and said virtual environment; and,
determining a current action for said virtual environment based on said asynchronous updates, understanding frames, and said data.

31. The interface of claim 1, wherein said understanding module, said response planner, and said generation module are included within a deliberative component.

32. The interface of claim 31, wherein said reactive component and said deliberative component are included within a response processor.

* * * * *